US012771470B2

(12) United States Patent
Selli

(10) Patent No.: US 12,771,470 B2
(45) Date of Patent: Oct. 20, 2026

(54) FIBER OPTIC TERMINALS WITH WAVELENGTH DIVISION MULTIPLEXING AND PHYSICAL PATH REDUNDANCY

(71) Applicant: CORNING RESEARCH & DEVELOPMENT CORPORATION, Corning, NY (US)

(72) Inventor: Raman Kumar Selli, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 342 days.

(21) Appl. No.: 18/243,369

(22) Filed: Sep. 7, 2023

(65) Prior Publication Data

US 2023/0418014 A1 Dec. 28, 2023

Related U.S. Application Data

(63) Continuation of application No. PCT/US2022/019659, filed on Mar. 10, 2022.

(60) Provisional application No. 63/160,347, filed on Mar. 12, 2021.

(51) Int. Cl.
*H04J 14/02* (2006.01)
*G02B 6/44* (2006.01)

(52) U.S. Cl.
CPC ...... *H04J 14/0297* (2013.01); *G02B 6/44528* (2023.05); *G02B 6/44715* (2023.05); *H04J 14/0283* (2013.01)

(58) Field of Classification Search
CPC .............. H04J 14/0297; H04J 14/0283; G02B 6/44715
See application file for complete search history.

(56) References Cited

U.S. PATENT DOCUMENTS

| | | | |
|---|---|---|---|
| 2011/0103804 A1 | 5/2011 | Kimio | |
| 2012/0082448 A1 | 4/2012 | Bouda et al. | |
| 2017/0212321 A1 | 7/2017 | Gronvall et al. | |
| 2019/0004251 A1 * | 1/2019 | Dannoux ............ | G02B 6/4471 |

FOREIGN PATENT DOCUMENTS

EP 0855814 A2 7/1998

OTHER PUBLICATIONS

International Search Report and Written Opinion of the International Searching Authority; PCT/US2022/019659; mailed on May 31, 2022, 16 pages; European Patent Office.

* cited by examiner

*Primary Examiner* — Sung H Pak
(74) *Attorney, Agent, or Firm* — Michael E. Carroll, Jr.

(57) ABSTRACT

Fiber optic terminals with wavelength division multiplexing (WDM) and connection ports supporting physical path redundancy for communication networks are disclosed. The fiber optic terminals provide multiple paths for optical communications. The fiber optic terminal comprises a shell that defines a cavity with at least one primary wavelength division multiplexing (PWDM) device and at least one redundant wavelength division multiplexing (RWDM) device disposed within the cavity of the shell.

21 Claims, 17 Drawing Sheets

FIBER OPTIC TERMINALS WITH WAVELENGTH DIVISION MULTIPLEXING AND PHYSICAL PATH REDUNDANCY

CROSS-REFERENCE TO RELATED APPLICATIONS

This application is a continuation of International Patent Application No. PCT/US2022/019659 filed on Mar. 10, 2022, which claims the benefit of priority of U.S. Provisional Application Ser. No. 63/160,347 filed Mar. 12, 2021, the content of which is relied upon and incorporated herein by reference in its entirety.

FIELD

The disclosure is directed to fiber optic terminals having a plurality of connector ports for receiving and optically mating fiber optic connectors in an optical communication network. Specifically, the fiber optic terminals comprise wavelength division multiplexing (WDM) and physical path redundancy for the connection ports of the terminal.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks in a quick and easy manner along with testing ability of optical links in the network.

Wavelength division multiplexing (WDM) such as dense wavelength division multiplexing (DWDM) technology is widely deployed to enhance bandwidth capacity of fiber optic networks. Where fiber is constrained, dense wavelength division multiplexing such as 40 or 96 channel DWDM systems can offer an easier and quicker path for increasing bandwidth capacity. Reliability of the network is also a consideration for robust and optical pathways may be built for supporting multiple paths to and from a destination. Thus, when failure occurs in one pathway, electronic or optical switching can re-route traffic along the secondary or redundant pathway.

A ring architecture also allows the flow of traffic in two different directions and can support multiple physical optical paths for redundancy as shown in FIG. 1. Redundancy is created because a node is able to send optical traffic either clockwise or counter-clockwise in the ring. FIG. 1 depicts an explanatory DWDM network for supporting a "ring" type architecture with optical add/drop multiplexing (OADM) at each node.

Add/drop multiplexers are useful passive fiber-optic components for either 'dropping' or 'adding' a DWDM channel at an ingress or egress point in the communication network without requiring electronic switching. FIG. 1 illustrates OADM devices configured in a bidirectional two fiber DWDM ring where optical channels are either dropped individually or in groups using optical bandpass filtering using thin-film or other suitable technology for wavelength filtering.

Terminals using DWDM also need to meet other limitations for field deployment such as ruggedness, reliability, space considerations and the like while supporting increased bandwidth for network densification. Consequently, there exists an unresolved need for terminals with connection ports with robust optical layouts for fiber optic networks.

SUMMARY

The disclosure is directed to fiber optic terminals (hereinafter "terminals") comprising wavelength division multiplexing (WDM) and physical path redundancy for the connection ports of the terminal. As used herein, "connection port" means a female optical interconnection port that receives and optically mates with a suitable male optic plug connector. A portion of the connection port passageway may be integrally formed in a portion of the shell of the terminal if desired and allows for compact terminal designs. The shell defines a cavity with at least one primary WDM (PWDM) device and at least one redundant WDM (RWDM) device disposed within the cavity of the shell.

The terminals may have an optical layout for the connection ports that supports transmit/receive (Tx/Rx) networks or bidirectional (Bidi) networks as desired. Consequently, the input connection port may support an optical connection with a single-fiber male plug connector or a multi-fiber male plug connector depending on the type of optical network architecture intended for the terminal. The primary output connection port(s) and the redundant output connection port(s) of the terminal are multifiber output connection ports for mating with multi-fiber male plugs of the breakout cable assemblies for channel distribution.

Terminals disclosed herein may use a shell comprising a first portion and a second portion. In further embodiments, the terminal may have a first set of connection ports integrally-formed in the first portion of the shell. Likewise, the terminal could have another set of connection ports integrally-formed in the second portion of the shell. Having multiple connection ports integrally-formed in the first or second portion of shell advantageously allows flexibility, scalability and modularity for different optical layouts in the terminals as disclosed. For instance, one embodiment of terminals could have all of the wired connection ports arranged on the first portion of shell in a predetermined layout. Moreover, the shell may be formed of two similar portions that form a shared cavity for reducing part count and allowing easier sealing of the terminal if desired.

One aspect of the disclosure is directed to fiber optic terminals for supporting physical path redundancy along with WDM device. Terminals comprising a shell, at least one PWDM device, at least one RWDM device, at least one input connection port, at least one multifiber primary output connection port, and at least one multifiber redundant output connection port are disclosed in various optical layouts.

The terminals have the PWDM device and RWDM device disposed within the cavity of the shell, and the at least one input connection port comprises a fiber input optical fiber and a second input optical fiber with the first input optical fiber being in optical communication with the PWDM device, and the second input optical fiber being in optical communication with the RWDM. Terminals may have suitable connection ports with optical fibers that are in optical communication with the PWDM and RWDM for the optical layout. The arrangement and layout of the PWDM and RWDM within the cavity of the shell as disclosed herein allows for compact form-factors for the terminal along suitable optical fiber routing and wiring within the cavity for ease of manufacture.

Compact form-factors for the terminal may have the multifiber primary output connection port comprising an optical connector opening and a connection port passageway formed in a portion of the shell for receiving at external male plug connector, and the multifiber primary output connection port is in optical communication with the PWDM device. The multifiber redundant output connection port may also comprise an optical connector opening and a connection port passageway formed in a portion of the shell for receiving at external male plug connector, and the multifiber redundant output connection port is in optical communication with the PWDM device.

Input connection ports may comprise multifiber connection ports comprising a first input optical channel and a second input optical channels. These first and second input optical channels may have Tx/Rx signals on separate optical fibers for each input optical channel or the input optical channels may have BiDi signals on each individual optical fiber as in the optical layout for the terminal.

Another aspect of the disclosure is directed to fiber optic terminals for supporting physical path redundancy using WDM devices. The terminals comprises a shell defining a cavity, at least one PWDM device disposed within the cavity, at least one RWDM device disposed within the cavity, at least one input connection port, at least one multifiber primary output connection port, and at least one multifiber redundant output connection port. The input connection port comprises two primary input optical fibers and two redundant input optical fibers. The two primary input optical fibers being in optical communication with the PWDM device, and the two redundant input optical fibers being in optical communication with the RWDM. The multifiber primary output connection port comprises an optical opening and a connection port passageway formed in a portion of shell for receiving an external male plug connector where the multifiber primary output connection port is in optical communication with the PWDM. The multifiber redundant output connection port comprises an optical opening and a connection port passageway formed in a portion of shell for receiving an external male plug connector where the multifiber redundant output connection port is in optical communication with the PWDM.

Yet another aspect of the disclosure is directed to fiber optic terminals for supporting physical path redundancy using WDM devices. The terminals comprises a shell defining a cavity, at least one PWDM device disposed within the cavity, at least one RWDM device disposed within the cavity, at least one input connection port, at least one multifiber primary output connection port, and at least one multifiber redundant output connection port. The input connection port comprises two primary input optical fibers and two redundant input optical fibers. The two primary input optical fibers being in optical communication with the PWDM device, and the two redundant input optical fibers being in optical communication with the RWDM. The multifiber primary output connection port comprises four optical channels (CH-P) with each of the four optical channels comprising a receive optical pathway (Rx) and a transmit optical pathway (Tx), and the multifiber primary output connection port comprises an optical opening and a connection port passageway formed in a portion of shell for receiving an external male plug connector where the multifiber primary output connection port is in optical communication with the PWDM. The multifiber redundant output connection port comprises four optical channels (CH-R) with each of the four optical channels comprising a receive optical pathway (Rx) and a transmit optical pathway (Tx), and the multifiber primary output connection port comprises an optical opening and a connection port passageway formed in a portion of shell for receiving an external male plug connector where the multifiber redundant output connection port is in optical communication with the PWDM.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The concepts disclosed are related to fiber optic terminals comprising ports for supporting physical path redundancy in an optical network with an optical layout that supports WDM devices. The terminals disclosed allow for communication networks with multiple paths for optical communications. The terminal comprises a shell that defines a cavity with at least one primary WDM (PWDM) device and at least one redundant WDM (RWDM) device disposed within the cavity of the shell.

The concepts disclosed advantageously robust communication networks and allow increased bandwidth for the network operators. The concepts disclosed also provide flexibility for the network operators to order the terminals for use with optical channels using separate Tx/Rx fiber transmission or optical channels with bidirectional transmission (BiDi). Moreover, the terminals disclosed provide flexibility and adaptability to alter the fiber optic network based on moves, adds or changes to the fiber optic network for 5G devices or the like. The concepts may be used with any suitable terminals and may be especially advantageous with terminals having compact form-factors. The concepts are scalable to any suitable count of input connection ports or pairs of primary/redundant input optical pathways wired to a single connection port. Likewise, the output connection ports of the terminal are scalable for different wiring for the desired optical layout in a similar fashion to cooperate with the input signals and WDMs disposed within the cavity of the terminal.

Terminals disclosed may also have a dense spacing of connection ports for receiving external male plug connectors. These types of terminals advantageously allow a relatively dense and organized array of connection ports in a relatively small form-factor while still being rugged for demanding environments; however terminals of any size or shape are possible using the concepts disclosed. As optical networks increase densifications and space is at a premium, the robust and small-form factors for devices such as terminals depicted herein becomes increasingly desirable for network operators.

The concepts disclosed herein are suitable for fiber optic networks and are equally applicable to other optical applications as well including indoor, industrial, wireless, or other suitable applications. Additionally, the concepts disclosed may be used with terminals having any suitable footprint or construction. Various designs, constructions, or features for fiber optic networks and terminals are disclosed in more detail as discussed herein and may be modified or varied as desired.

Figure 1:
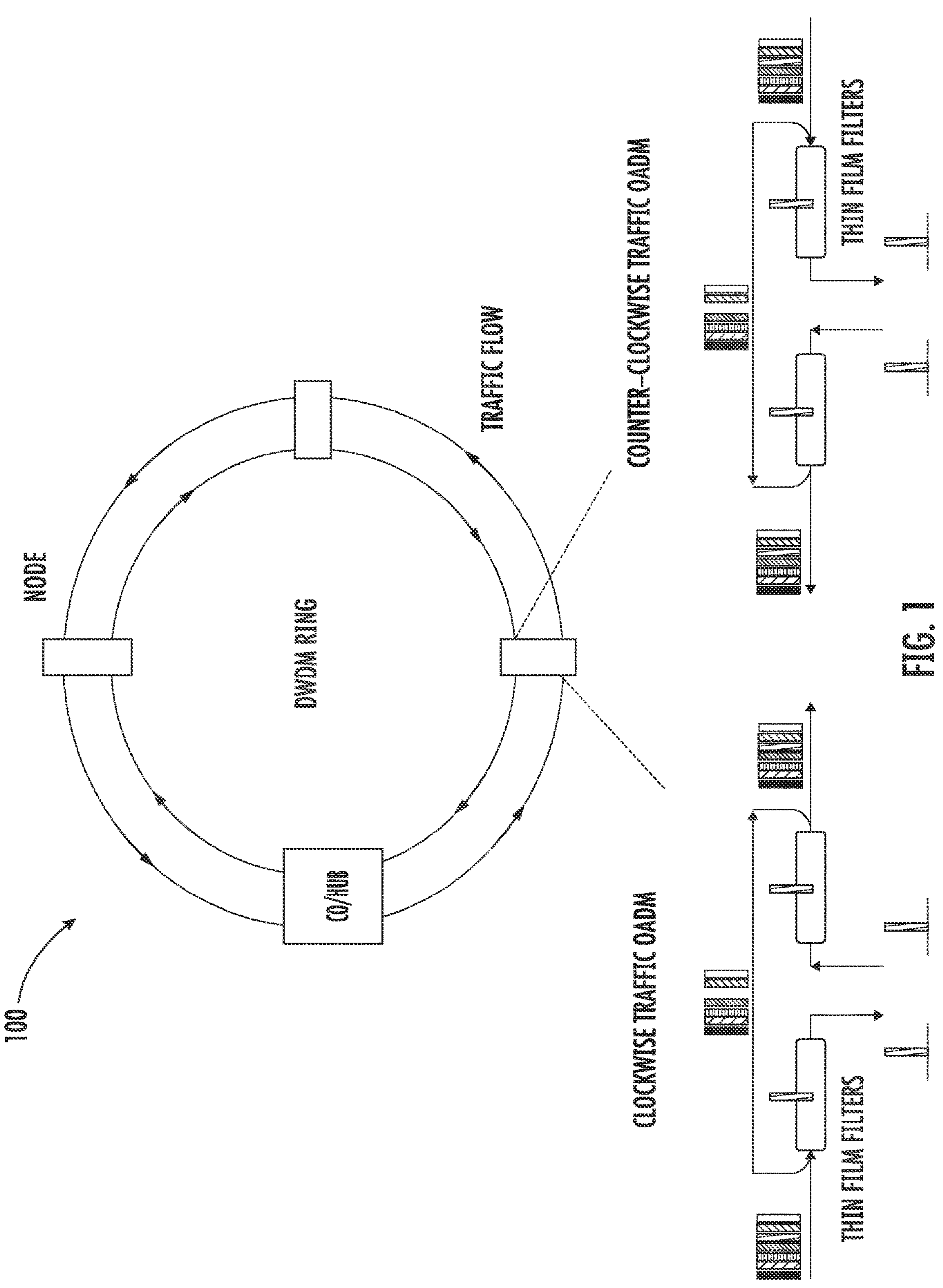
FIG. 1 is an optical network having physical path redundancy using a ring architecture with dense wavelength division multiplexing (DWDM)
Figure 2:
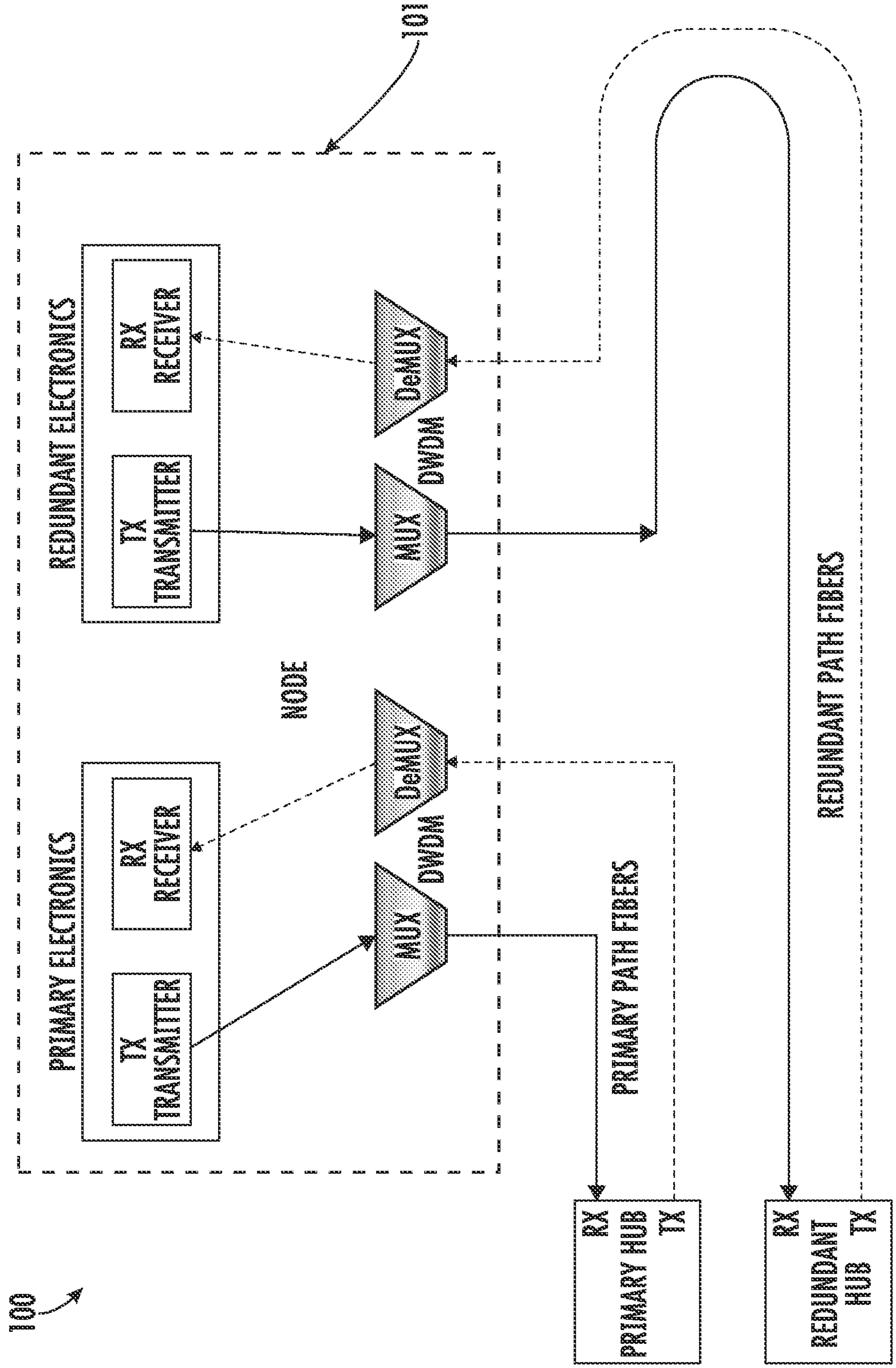
FIG. 2 is an explanatory DWDM supporting physical path redundancy at the node.

FIG. 2 is a schematic representation of an explanatory DWDM redundant path for physical path redundancy at a node. A redundant network requires the ability to divert traffic along two different paths, so that when one path is disrupted, traffic can be redirected and flow in the other path. To create multiple paths to a node in a DWDM network, a duplicate set of DWDM components is required. A typical DWDM configuration supporting a redundant path is schematically shown FIG. 2. As shown, there are two separates hubs at separate locations, each providing a signal path along separate physical paths and converging at the node through a common set of DWDM devices (e.g., Mux/DeMux device). Although a separate set of electronics is shown in FIG. 2, other ways of converging the two signal paths at the node of a network is possible through optical or electronic switching.

DWDM components have conventionally resided in central locations such as a central office or network hub, thereby making fiber management relatively easy to manage. However, when deploying these devices in the field such as a small cell or enterprise locations improved deployment for multiple fibers and channels is needed for avoiding costly deployment errors. The terminals disclosed use an optical layout and construction that provides compact form-factors along with flexibility, scalability and ease of construction while alleviating the complexities of fiber management in the terminal. The compact size of the terminal allows quick and easy deployment on poles or below-grade vaults where space may be at a premium. The terminal supports a plurality of multifiber connection ports allowing easier organization of multiple DWDM channels and drop cables from a single terminal. Terminals may also provide a quick and easy to use connector releases for the connection ports, thereby providing a simple, but elegant device for the user.

Figure 3:
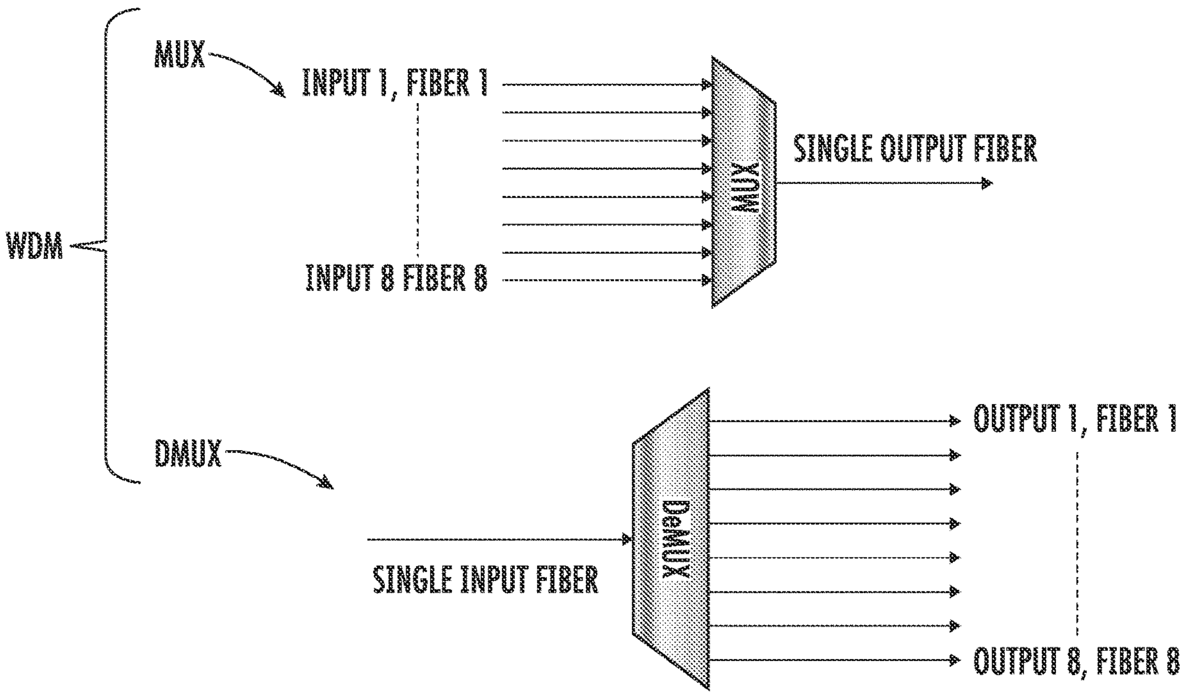
FIG. 3 depicts an explanatory wavelength division multiplexer (WDM) comprising a multiplexer for combining input wavelengths onto a single output fiber and a demultiplexer for separating out wavelengths from a single input fiber.

FIG. 3 depicts an explanatory wavelength division multiplexer (WDM) comprising a multiplexer for combining input wavelengths onto a single output optical fiber and a demultiplexer for separating out wavelengths from a single input optical fiber. A multiplexer (Mux) combines many different input wavelengths from different sources and fibers, onto a single output fiber. FIG. 3 shows the direction of optical signals for the multiplexer (Mux). Depending on the technology used the multiplexer can typically combine 48 or more wavelengths onto one fiber. The explanatory terminals are described with WDMs supporting 8 channels, but other suitable numbers of channels are possible such as 16 or more channels. A multiplexer usually works in conjunction with a demultiplexer (DeMux) that does the opposite of a multiplexer by separating out a collection of wavelengths from an optical fiber into many individual wavelengths on many fibers. The demultiplexer typically uses the same WDM filter technology, but that is not necessary. As shown, the DeMux signals travel in the opposite direction, and separates out the wavelengths from the single fiber. The WDMs may be packaged as a cassette with an array of thin-film filters connected to form a multi-channel DWDM multiplexer and demultiplexer.

Figure 4:
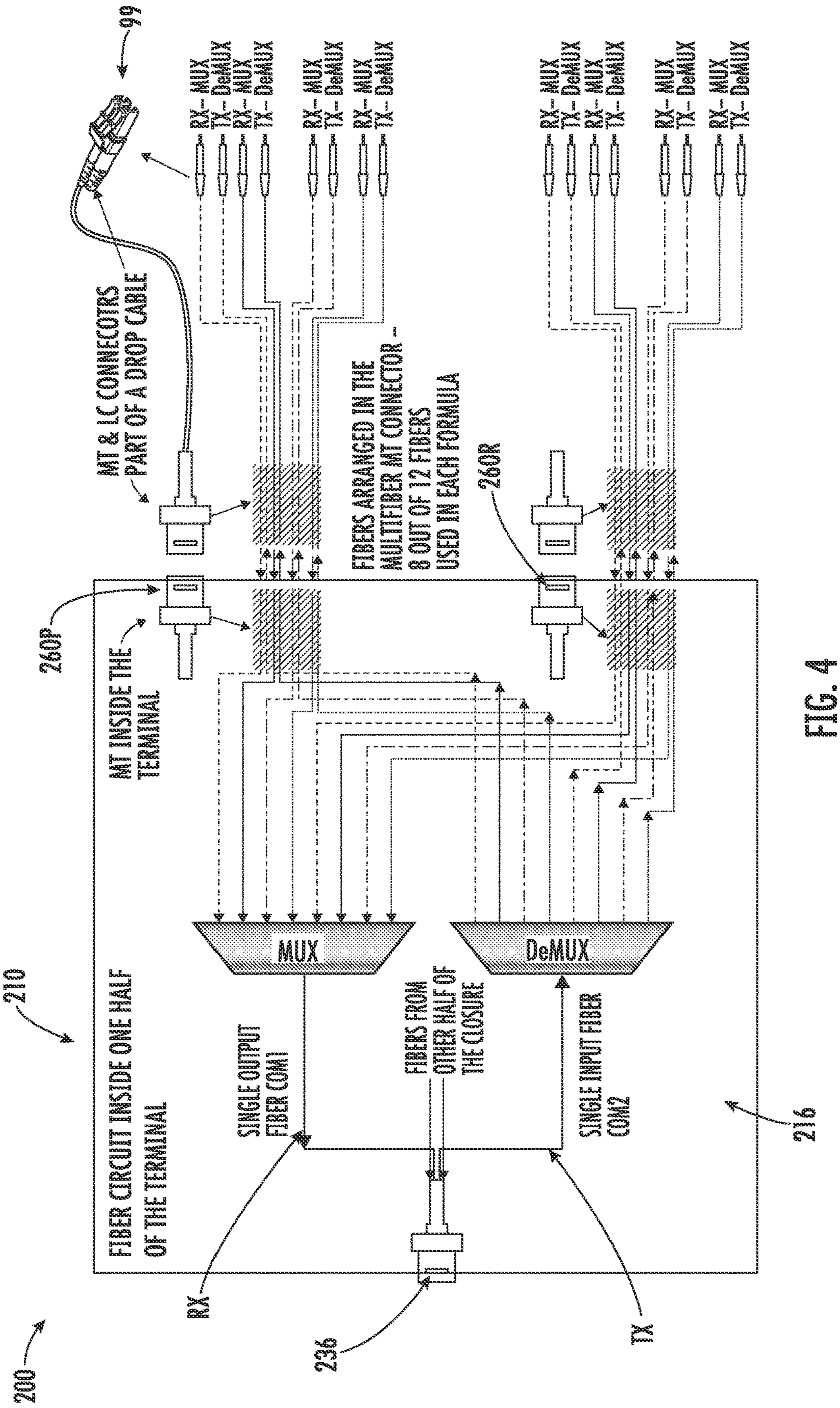
FIGS. 4 and 4A respectively depict one-half of the WDM wiring (either primary or secondary) for explanatory purposes and both primary and secondary wiring with an optical input and output ports wired for physical path redundancy using WDM in the terminal.
Figure 4A:
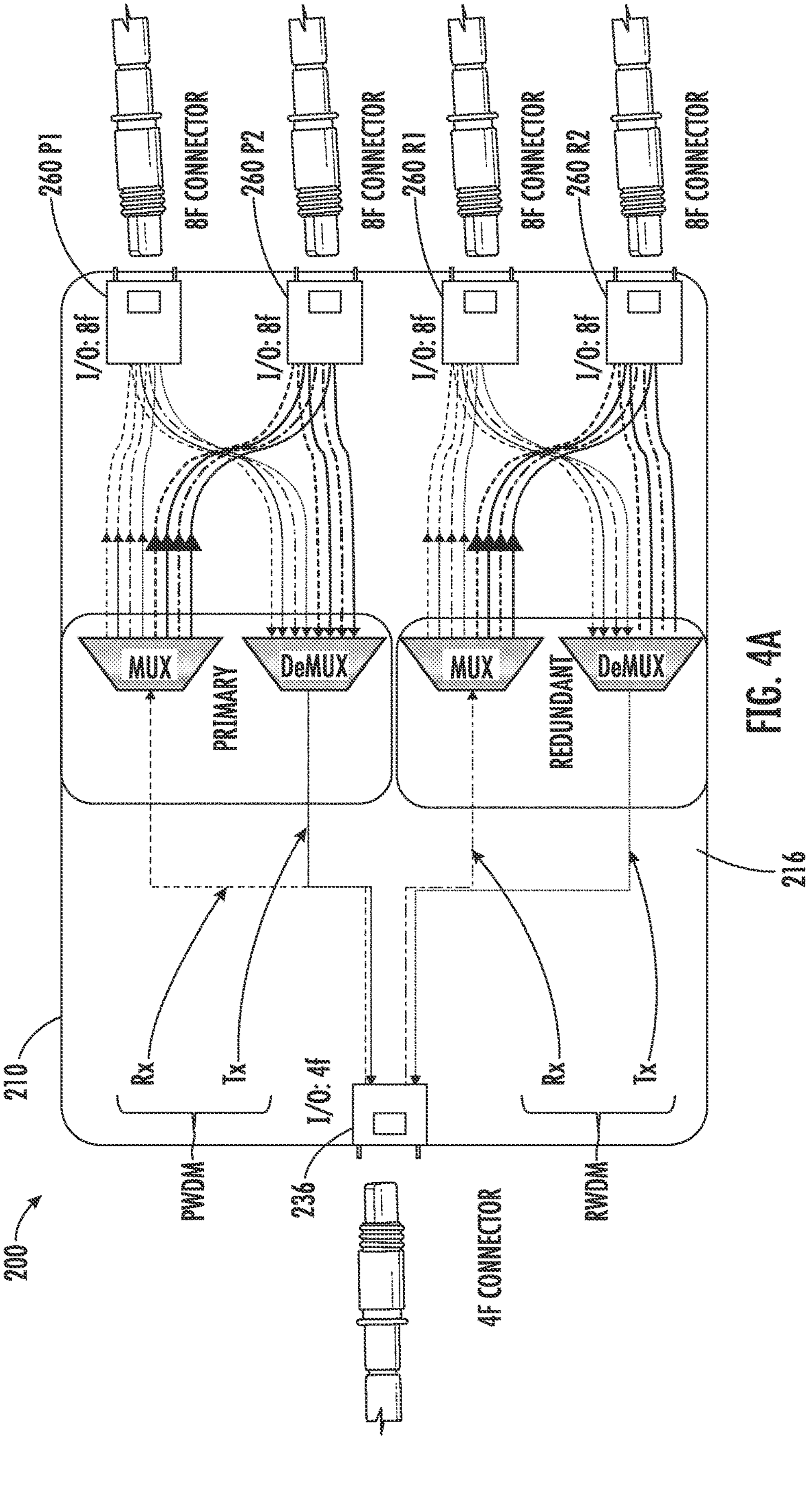

FIG. 4 is depicts an explanatory schematic of a portion of wiring within terminals 200 using a WDM device (represented by the Mux/DeMux) wired between the input connection port 236 and output connection ports 260P,260R for physical path redundancy. This wiring of FIG. 4 may be doubled for adding a second pairing PR2 (FIG. 8) of output connection ports 260P,260R wired for physical path redundancy using a second WDM device disposed within the cavity 216 of terminal 200. In other words, the four primary output channels (Tx/Rx pairs) and four redundant output channels (Tx/Rx pairs) are doubled by routing further optical fibers at the input connection port to a second WDM for supporting a second pairing PR2 of output channels. Thus, the terminals disclosed advantageously allow adding further channels to an optical network to increase the bandwidth. Other devices may also be disposed within the cavity 216 of terminal 200 such as power splitters/couplers or the like.

Figure 5:
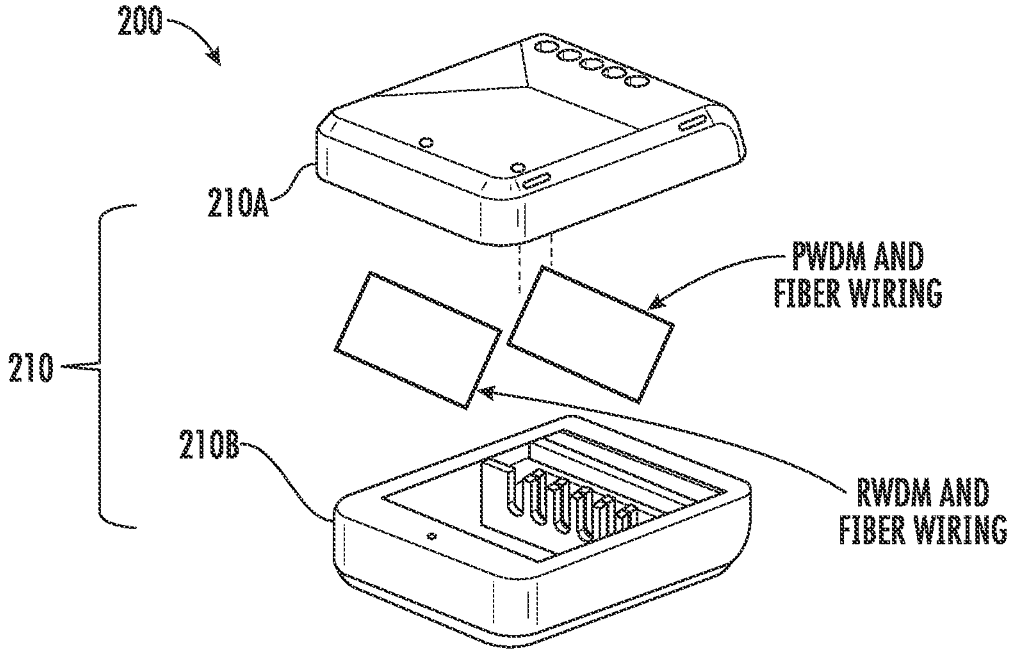
FIG. 5 depicts an explanatory shell having a cavity terminal for housing the PWDM and SWDM and optical fibers therein.

FIG. 5 depicts an explanatory shell 210 that forms a cavity 216 for housing the WDM(s) and optical fibers of terminal 200. Shell 210 comprises a first portion 210A and a second portion 210B that may be joined together. Each portion 210A,210B of the shell 210 may form part of one or more multifiber output connection ports 260P,260R. The output connection ports each comprise an optical connector opening 238 and a connection port passageway 233 formed in a portion of the shell 210. The multifiber output connection ports 260P,260R may receive and optically mate a suitable multifiber male plug connector. In advantageous embodiments, the connection ports are formed in a linear array along an end of one or more portions of the shell 210, thereby creating a compact form-factor for the terminal for applications where space is limited.

Figure 7:
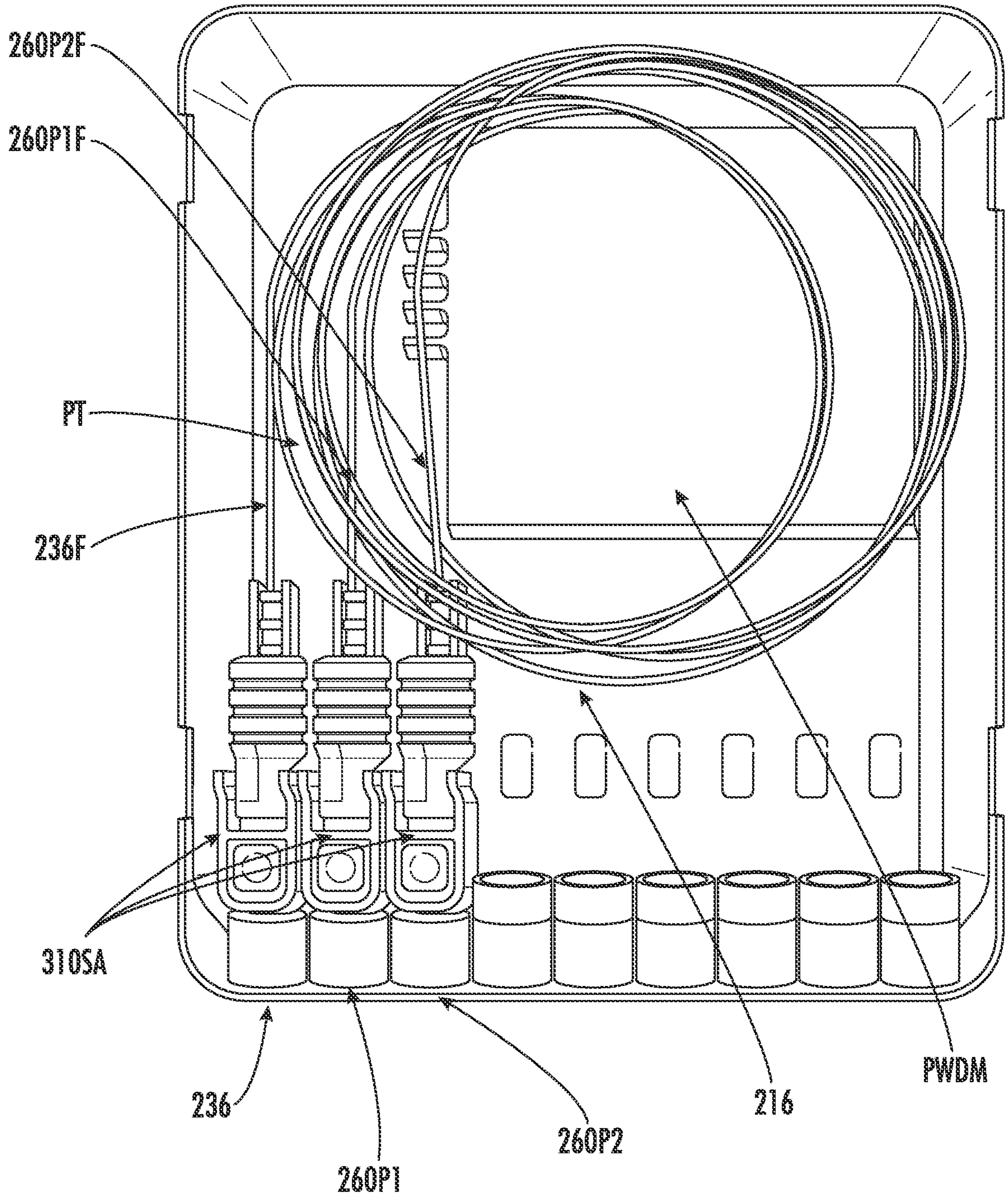
FIG. 7 shows an explanatory terminal with a portion of the shell removed showing three modular sub-assemblies for the respective connection ports and a WDM device disposed within the cavity of the shell.

One or more portions 210A,210B of shell 210 may cooperate to form cavity 216 of terminal 200. Portions 210A,210B of shell 210 may be similar or different as desired. For instance, both portions may have integrally-formed connection ports or not. As shown in FIG. 5, portions 210A,210B of shell 210 are configured for attaching at respective back surfaces and the shell houses the respective PWDM and RWDM devices along with the associated optical fiber wiring disposed within the terminal 200. The first and second portions 210A,210B may have one or more pass-thrus PT between the portions of the shell 210 for routing optical fibers from the first portion 210A to the second portion 210B such as shown in FIG. 7.

Other arrangements or constructions for the shell are also possible. For instance, one or more portions of shell 210 may comprise a mounting tab or the like. The mounting tab could be integrally formed with the shell 210 or as a separate piece as desired.

Figure 6:
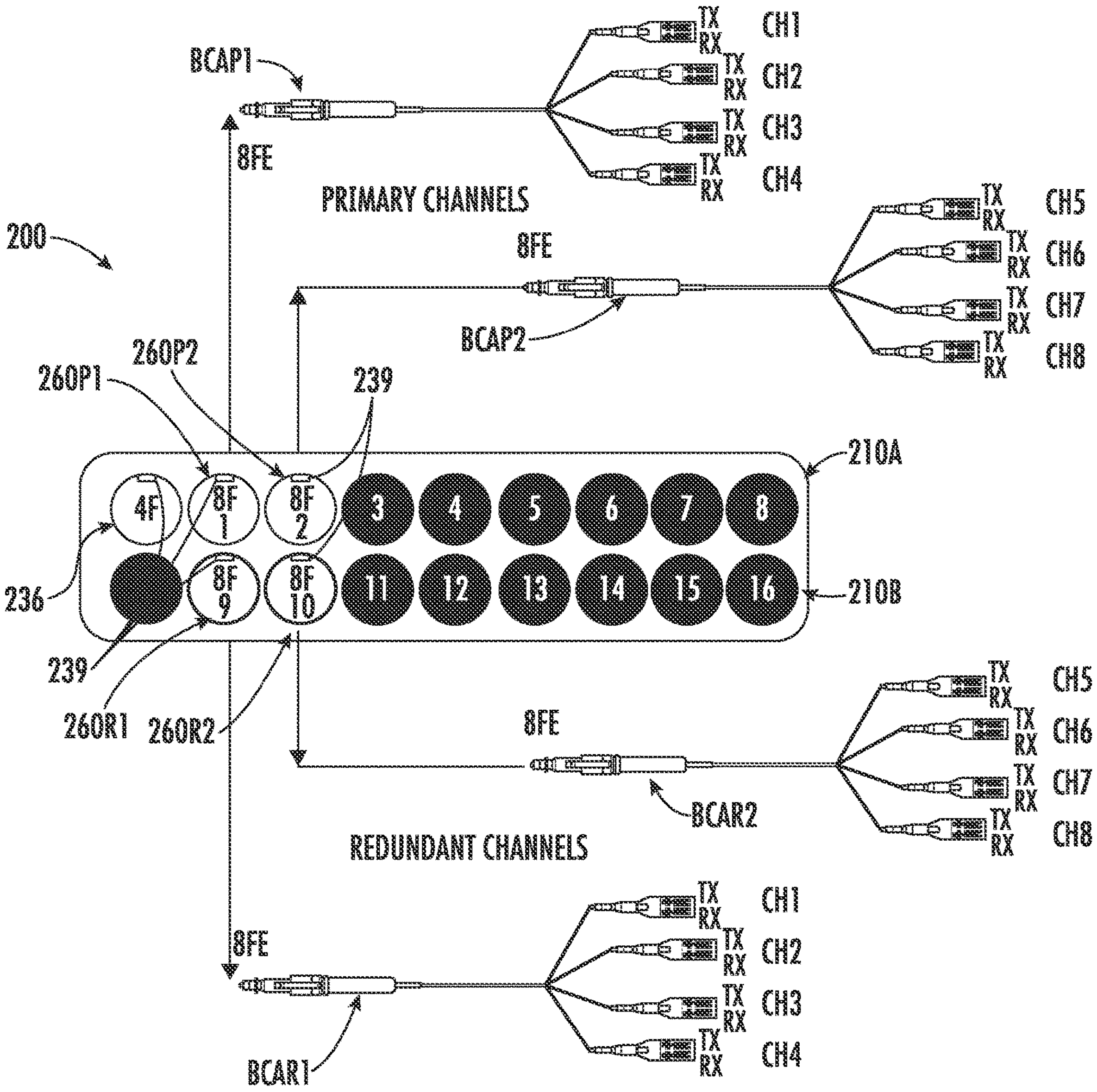
FIG. 6 depicts the optical layout for an explanatory terminal with physical path redundancy and WDM wiring between an input connection port and first and second pairs of primary and redundant connection ports.

FIG. 6 depicts the optical layout for a representative terminal 200 with two pairs of primary and redundant channels supported by a single input connection port. As depicted, the two primary multifiber output connection ports 260P1,260P2 are wired at ports numbered 1 and 2 for providing primary channels (CHP 1-4) and primary channels (CHP 5-8), respectively. The multifiber primary output connection ports 260P1,260P2 are formed in first portion 210A of shell 210 along with input connection port 236 and assembled with a modular sub-assembly 310SA as shown in FIG. 7 for providing optical mating with a suitable external multifiber connector. The multifiber redundant output connection ports are formed in second portion 210A of shell 210 at ports numbered 9 and 10 for providing redundant channels (CHR 1-4) and redundant channels (CHR 5-8), respectively as shown in this optical layout. Ports 3-8 and 11-16 are not optically wired within terminal 200 of FIG. 6 and are not functional in this optical layout.

The optical fibers routed to each of the input or output connection ports is terminated for a suitable optical connection at the port of terminal 200. By way of example, the connection ports may be suitable for making an optical connection using a MT connector or the like at the connection port for mating with external male plug connector received in the connection port passageway 233.

FIG. 6 also depicts explanatory terminal 200 with the external breakout cable assemblies (BCA) shown for the respective primary and redundant output connection ports of the terminal 200 for depicting the output wiring scheme for this optical layout. The breakout cable assemblies connect to the physical path redundancy of the communication network as discussed.

As shown, all of breakout cable assemblies (BCA) of FIG. 6 have a multifiber connector on a first end and a breakout of single fiber connectors on the second end such as eight single fiber connectors for separation of optical wavelengths. The multifiber connectors on the respective first ends of the breakout cable assemblies mate with the four the output connection ports of terminal 200.

The other ends of the respective breakout cable assemblies are optically wired as separate transmit/receive (Tx/Rx) connector pairs. For instance, each breakout cable assembly supports four channels with each channel having a Tx/Rx connector pair. This optical layout allows for all of the complexity to be managed using the fiber wiring within the terminal 200 so that the same or common breakout cable assembly may be used with the output connection ports of terminal 200.

FIG. 7 also depicts modular adapter sub-assemblies 310SA associated with each of the wired connection ports that may be used with terminals 200 such as shown in FIG. 6. Modular adapter sub-assemblies 310SA are assembled and installed into a portion of shell 210 so optical mating with an external male plug connector is possible. Each of the modular adapter sub-assemblies 310SA may receive one or more optical fibers such as associated with the input connection port 236 having fiber(s) 236F terminated at the input connection port for external mating. The modular adapter sub-assembly 310SA may include an adapter and a securing feature for mating the external male plug connector. The modular adapter sub-assembly may be employed in a variety of different configurations.

Likewise, the first and second primary connection ports 260P1,260P2 also have respective sub-assemblies 310SA associated with the connection ports that receive optical fibers 260P1F,260P2F with the desired fibers terminated for mating at the connection ports as shown in FIG. 7. Terminal 200 of FIG. 7 has three active connection ports are disposed on the first portion 210A of shell 210 and cooperate with respective sub-assemblies 310SA. Positions 3-8 and 11-16 not in use for terminal 200 of FIG. 6. This terminal has the redundant multifiber connection ports 260R1,260R2 disposed in the second portion 210B of shell 210 with respective connection ports assemblies and fiber wiring as well.

Figure 8:
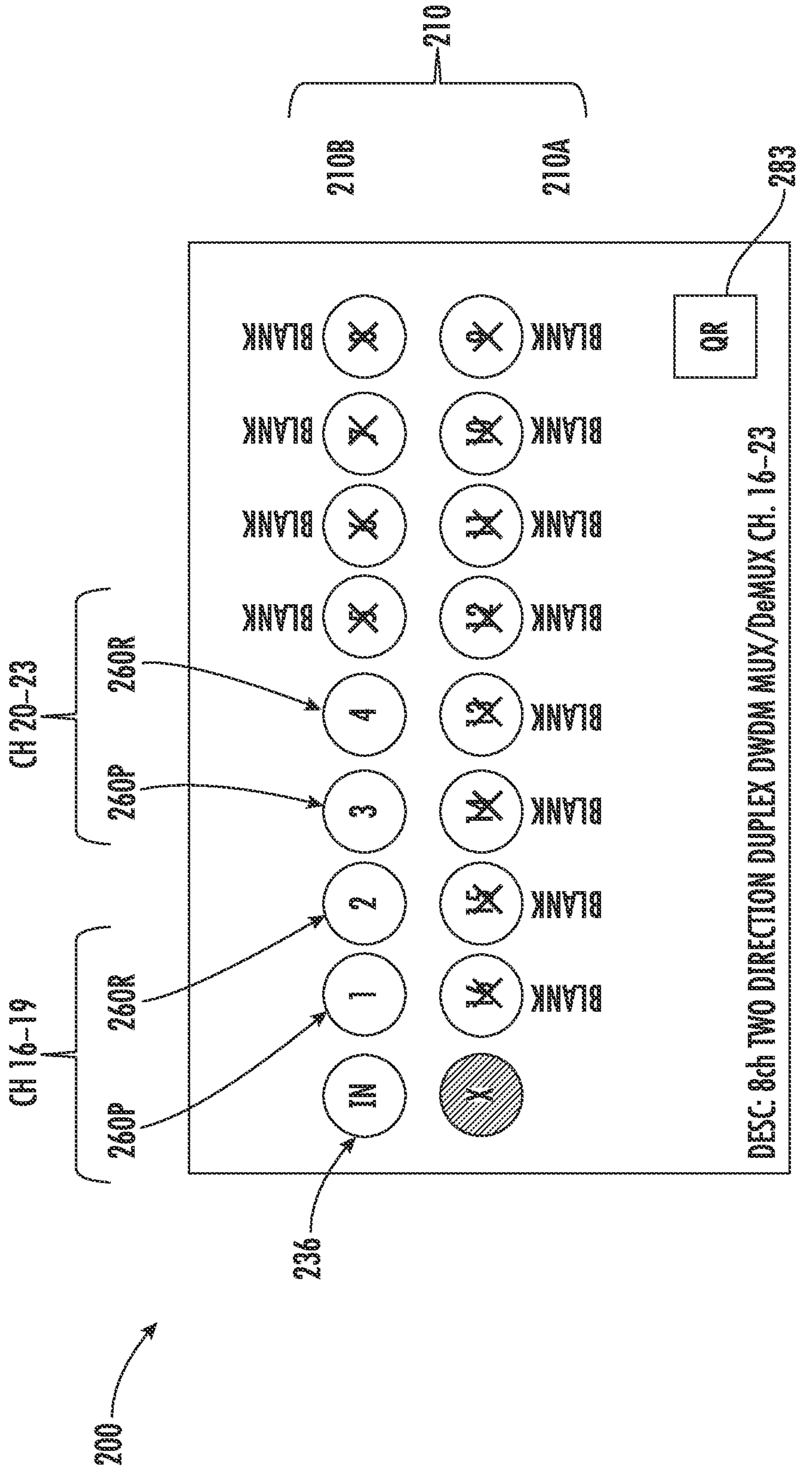
FIG. 8 depicts another optical layout for a representative terminal with physical path redundancy and WDMs wired between the input connection port and the primary and redundant connection ports.

Other optical layouts are also possible for terminals 200 such as having the primary and redundant output connection ports disposed on the same portion of the shell 210 such as shown in FIG. 8. This terminal 200 may be used with Tx/Rx optical layouts like FIG. 6 or with bidi optical layouts as discussed herein.

For instance, the input optical fibers may route to WDM devices disposed in the first portion 210A of the shell 210 and the input and output connection posts 236,260P,260R are disposed in the second portion 210B of shell 210. This allows compact packing of the PWDMs and RWDMs and efficient wiring of the optical fibers to active connection ports within the terminal 200. Still other layouts for the connection ports and/or internal packaging are possible for the terminals disclosed.

Figure 9:
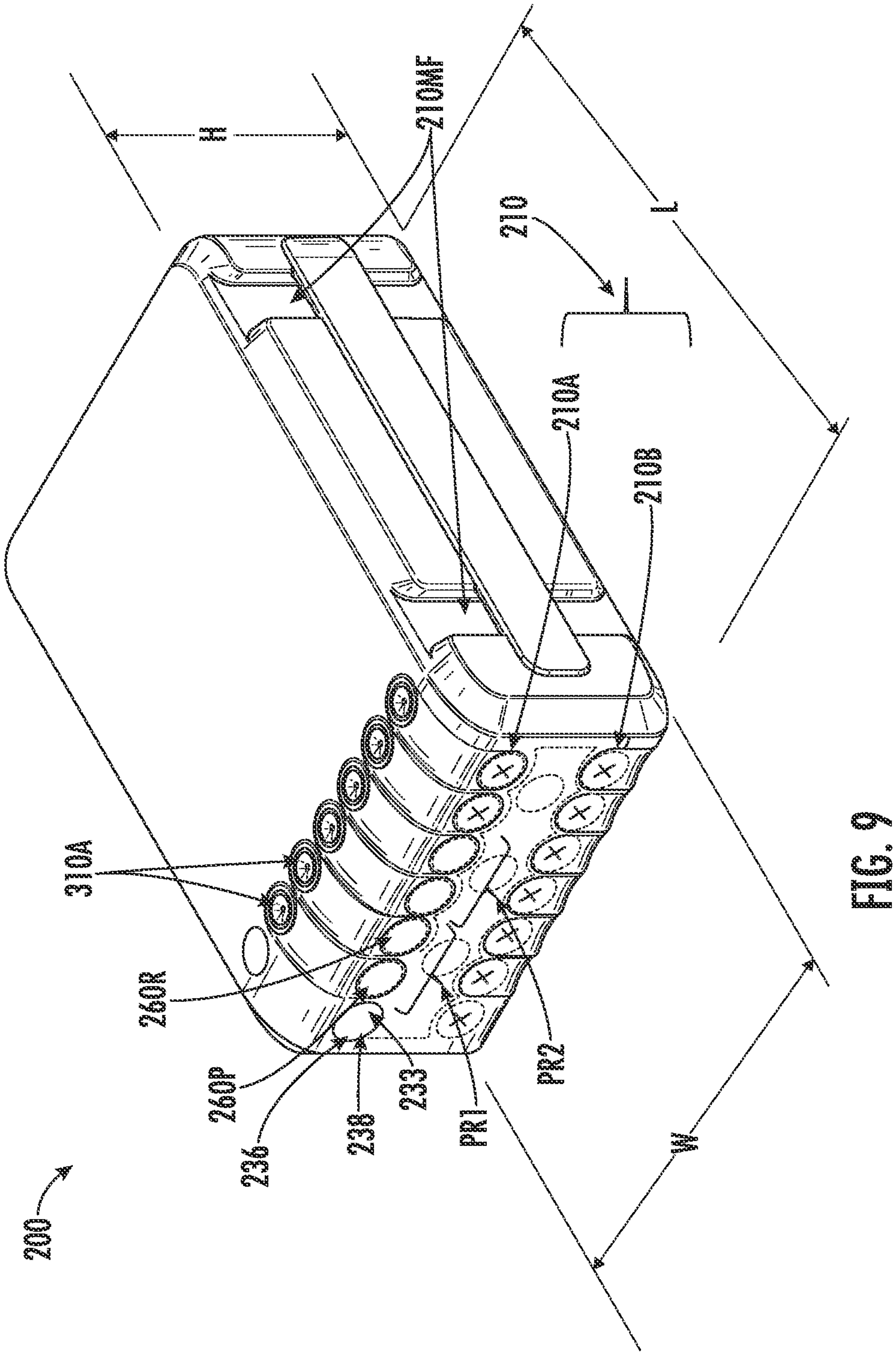
FIG. 9 is a perspective view of a terminal with an optical layout similar to the terminal of FIG. 8 with adjacent primary and redundant connection ports arranged in pairs on the top-row of connection ports of the terminal.

FIG. 9 depicts a version of the terminal 200 with the optical layout of FIG. 8 with at least one PWDM device and at least one RWDM device such as WDM cassettes disposed in a first portion 210A of shell 210 and all of the active output connection ports with their respective modular adapter sub-assemblies 310SA disposed within the second portion 210B of shell 210 as depicted. Specifically, the input connection port 236 and two pairs PR1,PR2 of output primary and redundant connection ports for four channels 16-19 having Tx/Rx optical pathways and four channels 20-23 also having Tx/Rx optical pathways are disposed in the second portion 210B of shell 210. Fiber routing may pass between the connection ports and the PWDM and RDWM in a suitable manners for the given arrangement.

Figure 10:
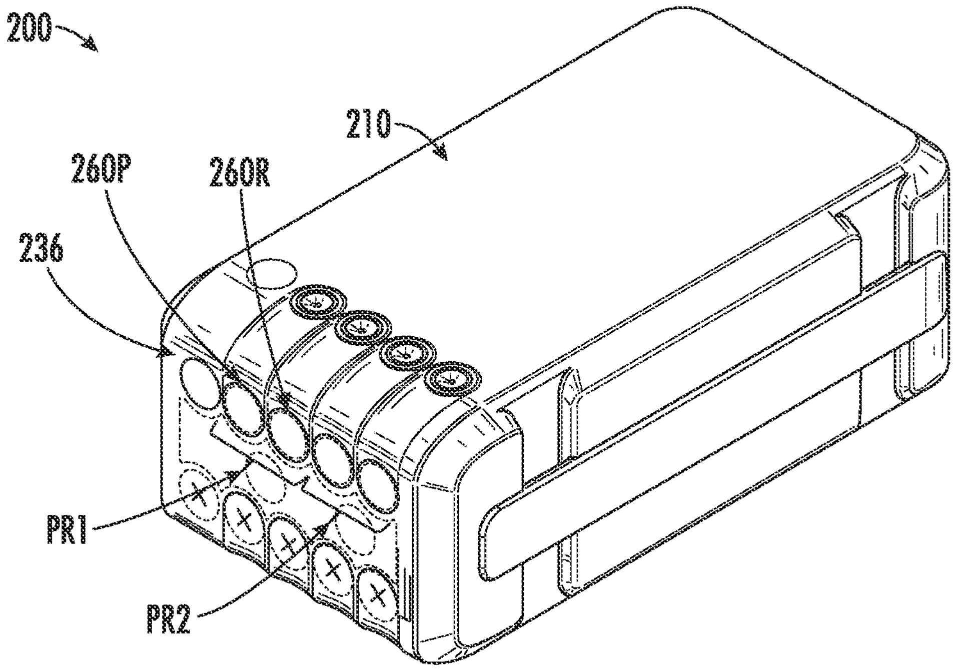
FIG. 10 is another similar terminal with an optical layout having adjacent primary and redundant multi-fiber connection ports arranged in pairs on the same row of connection ports.
Figure 13:
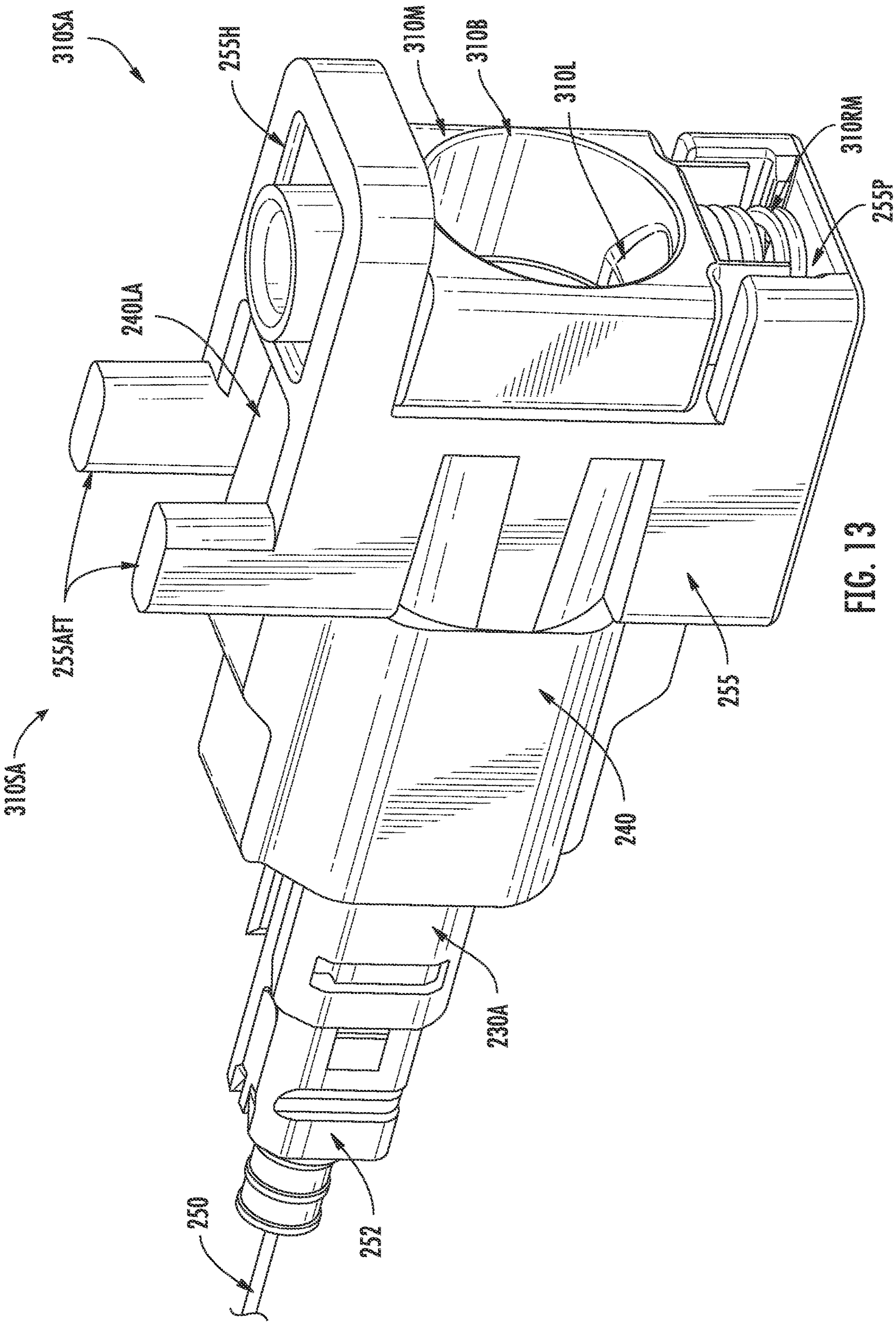
FIG. 13 depicts an assembled view of an explanatory modular sub-assembly of the terminal that cooperates with a connection port for enabling an optical connection with an external male plug connector.
Figure 14:
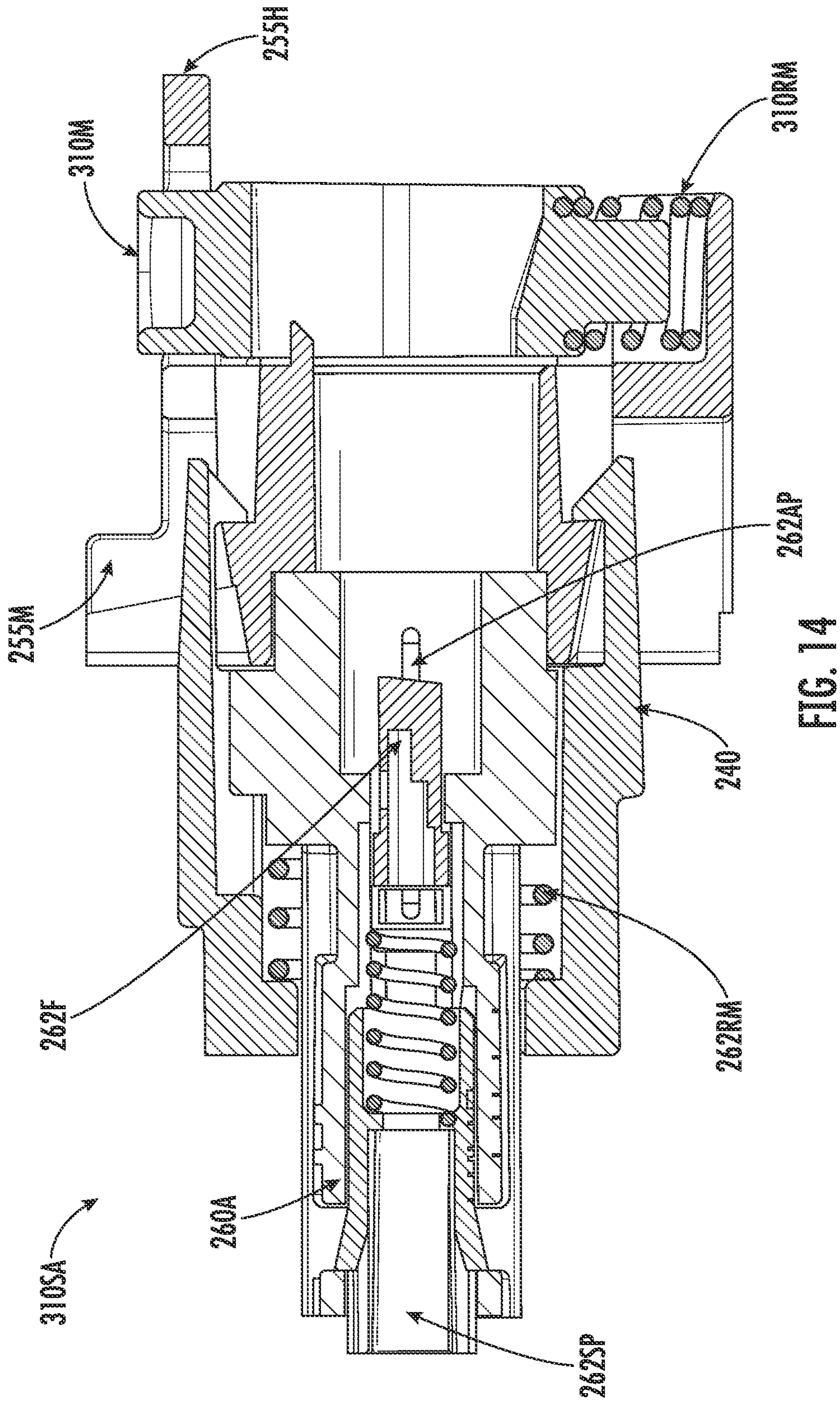
FIGS. 14 and 14A depicts a sectional view of another explanatory modular sub-assembly for the terminal that cooperates with a connection port for enabling a multifiber optical connection with an external multifiber male plug connector.

Alternatively, optical layouts are also possible for terminals 200 and may use fewer or more connection ports for physical path redundancy as desired. For instance, the input optical fibers may route to PWDM devices in the first portion 210A and RWDM devices in a second portion 210B of the shell 210. The input connection ports may be configured as a single-fiber input connection port using modular adapter sub-assembly 310SA such as shown in FIG. 13 for a bidirectional optical layout, or the input connection port may be configured as a multifiber input connection port using modular adapter sub-assembly 310SA as shown in FIG. 14. more than one portion or not as desired. FIG. 10 depicts another terminal 200 similar to the optical layout of terminal of FIG. 9, but it has fewer unused ports (not assembled with a modular adapter sub-assembly for mating) and provides a smaller form-factor. Unused ports of terminal 200 may have a dust plug (not shown) or other device for keeping dirt, debris or moisture out of the terminal 200.

Figure 11:
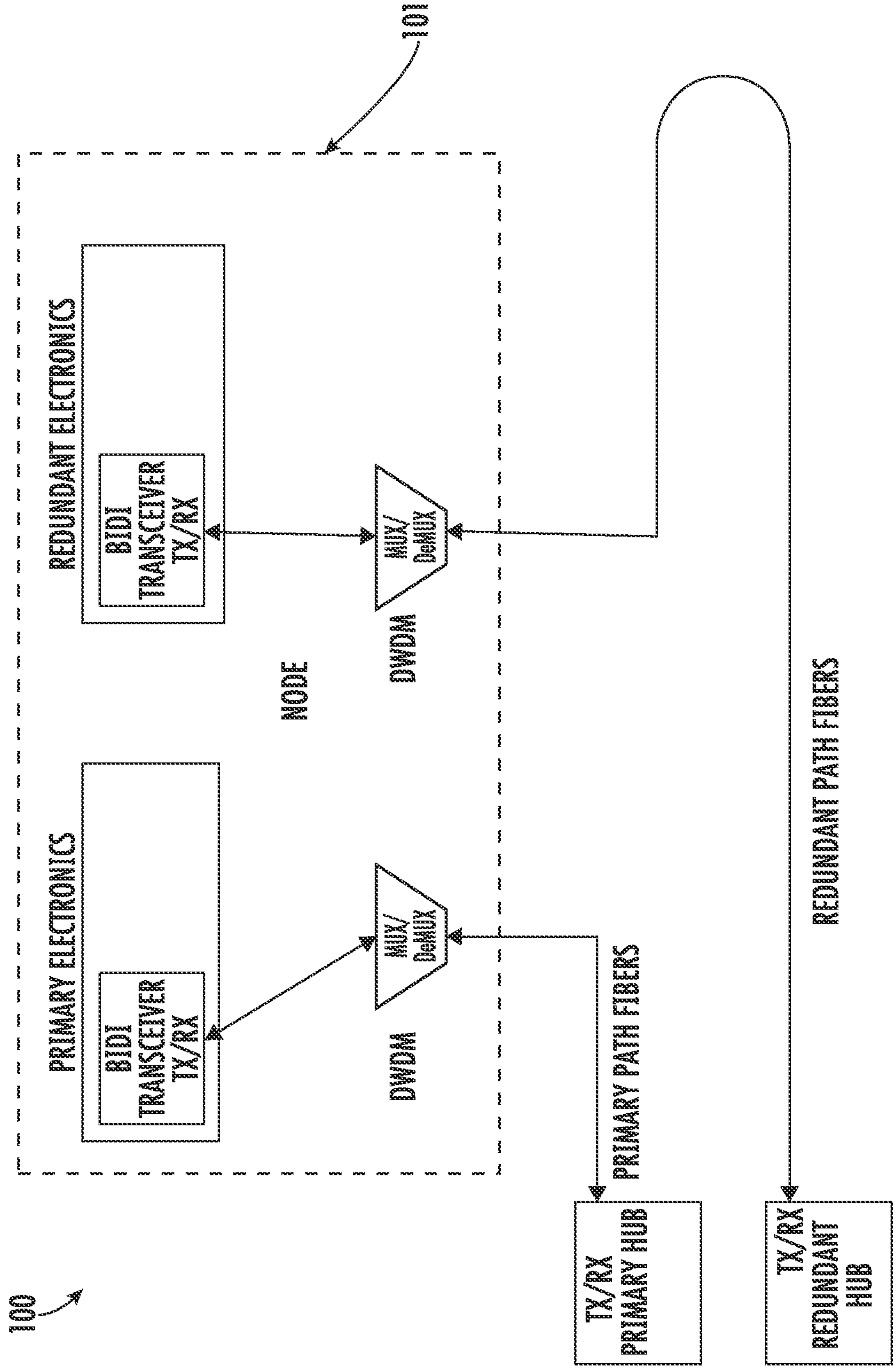
FIG. 11 depicts a primary pathway and a redundant pathway for a bidirectional optical fiber network.

FIG. 11 depicts a primary pathway and a redundant pathway for a bidirectional optical fiber network.

Figure 12:
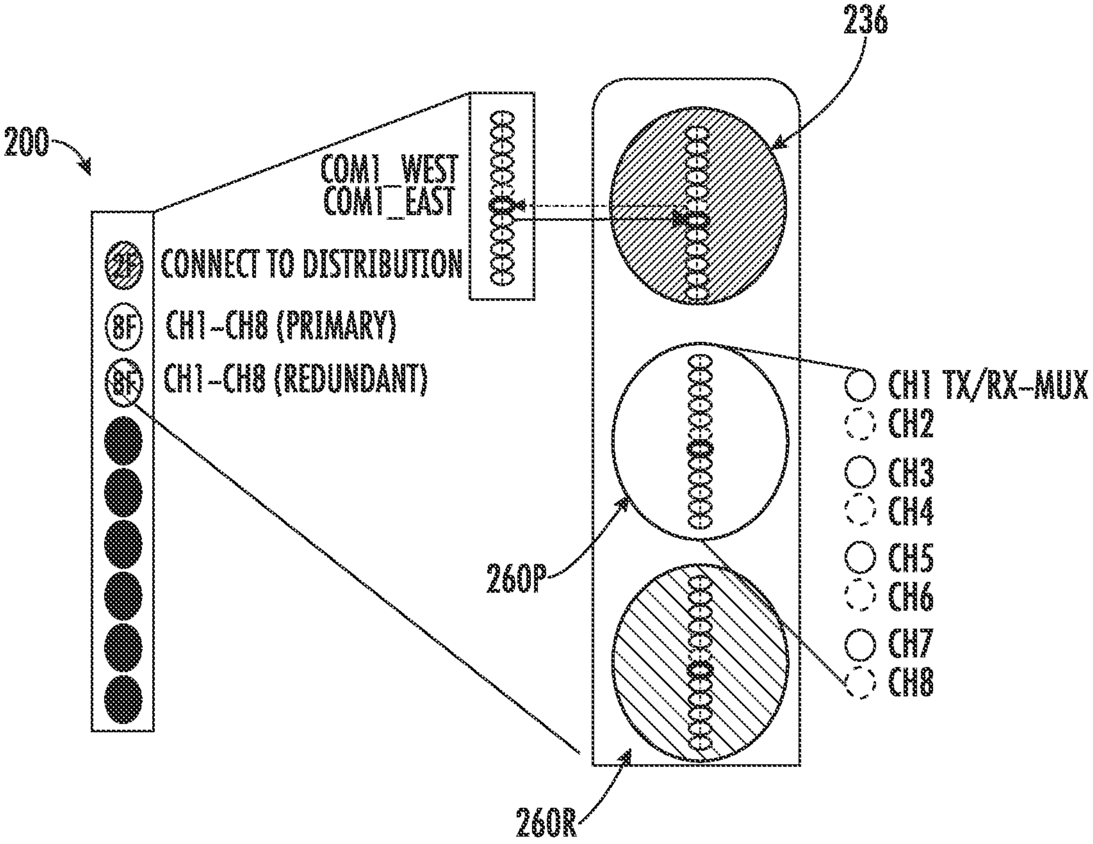
FIG. 12 depicts a terminal with an optical layout for a bidirectional network with an input connection port along with primary and redundant multi-fiber output connection ports.

FIG. 12 depicts a terminal with an optical layout for a bidirectional network with an input connection port along with primary and redundant multi-fiber output connection ports;

The concepts disclosed herein may be used with any suitable terminal comprising one or more inputs and a plurality of output connection ports for supporting physical path redundancy. The output connection ports may include any suitable mating mechanism or geometry for securing the external connector to the terminal. Although, the terminals 200 disclosed herein comprise a shell 210 comprising a cavity 216 and may use one or more modular adapter sub-assemblies 310SA as described herein for the connection ports other mating mechanisms are possible according to the concepts disclosed.

The connection ports of the disclosed terminals provide a push-and-retain connection without the use of threaded coupling nuts or quick turn bayonets for securing the external connectors. This allows for terminals with connection ports that are closely spaced together and may result in relatively small terminals since the room needed for turning a threaded coupling nut or bayonet is not necessary. The compact form-factors may allow the placement of the terminals in tight spaces in indoor, outdoor, buried, aerial, industrial or other applications while providing at least one connection port that is advantageous for a robust and reliable optical connection in a removable and replaceable manner. The disclosed terminals may also be aesthetically pleasing and provide organization for the optical connectors in manner that the prior art terminals cannot provide. However, the external fiber optic connectors may be secured to the terminal using any suitable structures such as threads, bayonets or other suitable mating geometry for attaching to the connector ports of the terminal.

Returning to FIG. 7, the terminals 200 comprise a shell 210 with a cavity 216 along with a securing feature 310 comprising a securing member 310M associated with the port passageway 233 of the connection ports that support physical path redundancy as disclosed herein. As described herein, the connection ports each comprises a port opening extending from an outer surface of the terminal 200 into the cavity 216 of the terminal 200 and each port respectively defines a connection port passageway 233 along a longitudinal axis. Each wired or activeconnection port of terminal 200 has a respective securing member 310M that is associated with the connection port and that securing member 310M may be a portion of modular adapter sub-assembly 310SA as disclosed.

Figure 17:
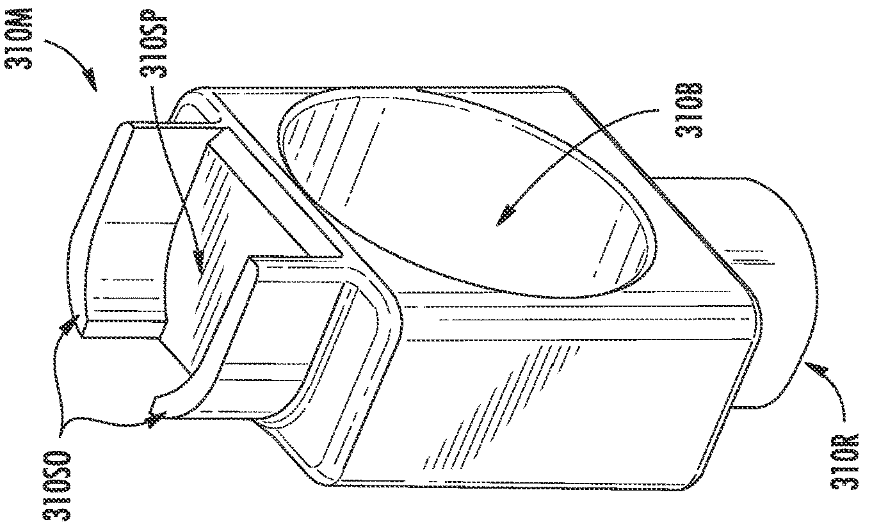
FIGS. 15-17 are various views showing the details of the securing member of modular sub-assemblies of FIGS. 13 and 14.
Figure 16:
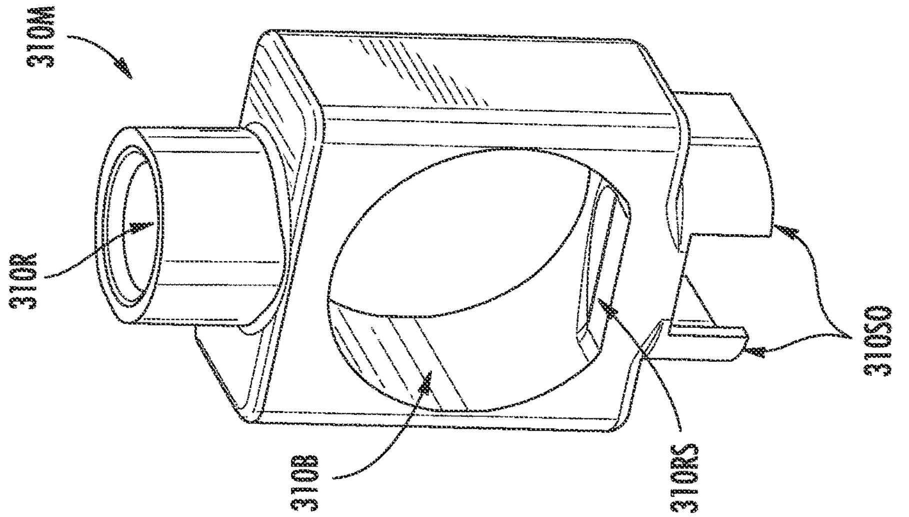
Figure 15:
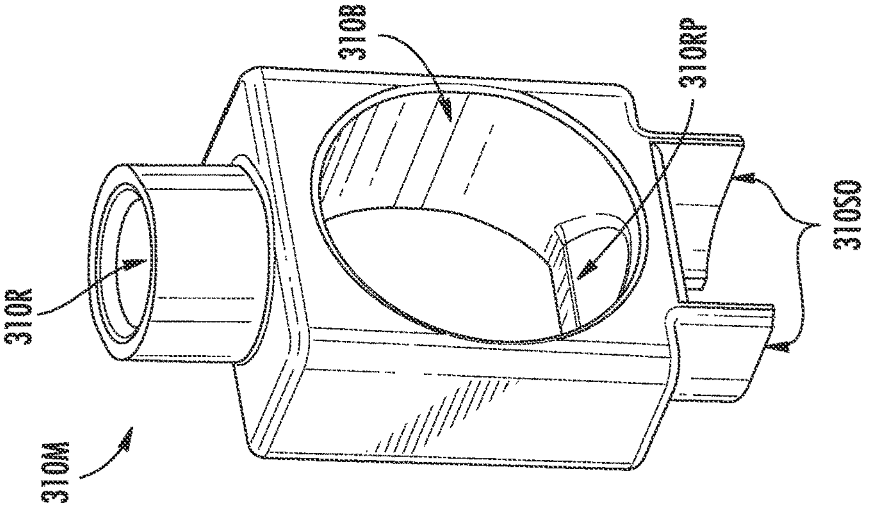

FIGS. 15-17 depict securing member 310M comprising a locking feature 310L and will be discussed in further detail. The securing member 310M may be used with a securing feature 310 for releasably attaching an external male plug connector to a respective connection port of terminal 200. As shown, each securing member 310M comprises a bore 310B suitable for receiving and securing a portion of the housing of a suitable the external male plug connector of the respective breakout cable assembly such as FIG. 6. Terminals 200 may also advantageously use the securing members 310M for releasably connecting the external male plug connectors in the respective connection ports using an actuator 310A of securing feature 310 as shown in FIG. 9.

Specifically, each securing member 310M has a locking feature 310L that cooperates with locking feature formed on the housing of the respective external male plug connector when fully-inserted into the respective connection port for securing the connector. The external connector may have cooperating geometry that engages the locking feature 310L of securing member 310M of terminal 200. As best shown in FIGS. 9 and 10, locking feature 310L of securing member 310M comprises a ramp 310RP. The ramp is integrally formed at a portion of the bore 310B with the ramp angling up when looking into the connection ports. The ramp allows the housing of the external connector to push and translate the securing member 310M downward against the securing feature resilient member 310RM as the external connector inserted into the connection port. Locking feature or ramp may have any suitable geometry. Once the locking feature 310L of the securing member 310M is aligned with the cooperating geometry of the external connector, then the securing member 310M translates upward so that the locking feature 310L engages the external connector.

Locking feature 310L of securing member 310M secures the external male plug connector in the respective connection port of terminal 200 when the external connector is full-seated within connection port so that the securing member 310M may be biased to a retain position. In other words, external connector has a cooperating geometry that engages the locking feature 310L of securing member 310M of terminal 200. As best shown in FIGS. 15 and 16, locking feature 310L of securing member 310M comprises a ramp 310RP. The ramp is integrally formed at a portion of the bore 310B with the ramp angling up when looking into the connection ports. The ramp allows the housing of external male plug connector to push and translate the securing member 310M downward against the securing feature resilient member 310RM as the connector is inserted into the respective connection port. Ramp may have any suitable geometry. Once the locking feature 310L of the securing member 310M is aligned with the cooperating geometry of the external male plug connector, then the securing member 310M translates upward so that the locking feature 310L engages the locking feature 20L Locking feature 310L comprises a retention surface 310RS. In this embodiment, the back-side of the ramp of locking feature 310L forms a ledge that cooperates with complimentary geometry on the housing 20 (or external connector). However, retention surface 310RS may have different surfaces or edges that cooperate for securing connector for creating the desired mechanical retention. For instance, the retention surface 310RS may be canted or have a vertical wall. However, other geometries are possible for the retention surface 310RS.

Connection ports of terminal 200 each comprises a respective optical connector opening 238 extending from an outer surface 234 of the terminal 200 into a cavity 216 of the terminal 200 and defining a portion of a connection port passageway 233 for receiving the external male plug connector. By way of explanation, the connection ports may be is molded as a portion of shell 210, but other constructions are possible such as sleeving the ports. At least one securing feature 310 is associated with the active connection port passageway 233 for mating.

Terminals 200 disclosed may use one or more modular adapter sub-assemblies 310SA (FIGS. 7, 13 and 14) disposed within the shell 210 when assembled for a scalable form-factor for manufacturing similar devices with different optical layouts such as connector port counts. However, the concepts may be employed without the use of the modular adapter sub-assemblies by having the adapters mounted on a common part, but then the adapters for the individual connection ports would not "float" independently.

Shell 210 comprises at least one input connection port 236 and a first set of primary and redundant output connection ports each respectively associated with a respective securing features 310 for cooperating with the connection ports for providing quick and easy optical connectivity with external connectors for providing a robust and reliable assembly design that is intuitive to use.

The securing feature 310 advantageously allows the user to make a quick and easy optical connection at the connector port(s) of terminal 200 for connectivity into the communication network. The securing feature 310 may also operate for providing a connector release feature by moving the actuator 310A such as a button to translate the securing member 310M to an open position (e.g., downward) for releasing the external fiber optic connector 100.

External multifiber connectors terminated to breakout cable assemblies may be retained within the respective ports of the terminal 200 by pushing and fully-seating the male plug connector within the connection ports if the securing member 310M is allowed to translate to an open position when inserting the external fiber optic connector. To release the external connector from the respective port, the actuator 310A is actuated by moving the actuator 310A (e.g., pressing the button downward) and translating the securing member 310M so that the locking feature disengages from the external connector and allowing the connector to be removed from the port. Stated another way, the at least one securing feature 310 is capable of releasing the connector when a portion of the securing feature 310 (i.e., the securing member 310M) translates within a portion of a securing feature passageway 245 of the shell 210. The full insertion and automatic retention of the connector may advantageously allow one-handed installation of the connector by merely pushing the external connector into the respective port. The devices disclosed may accomplish this connector retention feature upon full-insertion by biasing the securing member 310M of the modular adapter sub-assemblies 310SA to the retain position. However, other modes of operation for retaining and releasing the connector are possible according to the concepts disclosed. As discussed, the securing feature may be designed to require actuation by translating the actuator 310A for inserting the connector; however, this may require a two-handed operation.

Shell 210 may be formed by a first portion 210A and a second portion 210B, but other constructions are possible for shell 210 using the concept disclosed. Terminal 200 may comprise mounting features 210MF that are integrally formed in the shell 210 as shown in FIG. 9. By way of example, terminals 200 show the shells 210 having mounting features 210MF disposed near the sides of shell 210. Thus, the user may simply use a fastener such as a zip-tie threaded thru these lateral passageways for mounting the terminal 200 to a wall or pole as desired Securing member 310M may be biased by a resilient member 230RM to the retain position RP (e.g., upward). Furthermore, the securing features 310 or portions of securing features 310 may be constructed as a portion of a modular adapter sub-assemblies 310SA such as shown in FIGS. 13-15 for easy assembly of the terminal 200. Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

As best depicted in FIG. 9, a button or actuator 310A cooperates by engaging with securing member 310M to provide linear downward translation of the respective securing member 310M. When assembled, the translating of the actuator 310A causes the securing member to translate from a retain position RP to an open position OP and vice versa. Consequently, a portion of securing feature 310 (i.e., the securing member 310M) is capable of translating within a portion of the securing feature passageway 245 transverse to the longitudinal axis of the connection port passageway when translating the actuator 310A relative to the securing feature passageway 245 or shell.

If a push and click port is desired when the securing feature 310 is in the retain position, then the actuator 310A would only influence the position of the securing member 310M in one direction (and a securing feature resilient member 310RM would be used) so that the external connector may be still be inserted when the actuator 310A is placed in the retain position by allowing the translation of the securing member 310M downward upon insertion. Actuator 310A may also include a sealing feature (not visible) such as an O-ring for providing a seal between a portion of the securing feature 310 and the securing feature passageway 245 of the shell to inhibit dirt, dust and debris from entering the device.

As best shown in FIGS. 15-17, the securing member 310M comprises a bore 310B that is aligned with the connector port passageway 233 when assembled. Bore 310B is sized for receiving a suitable external connector therethrough for securing the same for optical connectivity. Bores or openings through the securing member 310M may have any suitable shape or geometry for cooperating with its respective external connector (or housing 20). As used herein, the bore may have any suitable shape desired including features on the surface of the bore for engaging with the desired connector. Bore 310B is disposed on the securing member 310M may also comprise any suitable locking feature disposed within the bore 310B as desired. For instance, the locking feature 310L disposed within the bore 310B may be a pin, pin with a ramp, or other suitable structure for engaging with the external connector.

In some embodiments, a portion of the securing member 310M is capable of moving to an open position when inserting a suitable external connector 10 into the connection port passageway 233. When the connector 10 is fully-inserted into the connector port passageway 233, the securing member 310M is capable of moving to the retain position automatically. Consequently, the external connector is secured within the respective port by the securing feature 310 without turning a coupling nut or a bayonet on the external connector like the prior art terminals. Stated another way, the securing member 310M translates from the retain position to an open position as the external fiber optic connector 100 is inserted into the respective port. The securing feature passageway 245 is arranged transversely to a longitudinal axis LA of the terminal 200, but other arrangements are possible. Other securing features may operate in a similar manner, and use an opening instead of a bore that receives the connector therethrough.

Generally speaking, the connection port passageways may be configured for the specific connector intended to be received in the port. Likewise, the connection port passageways should be configured for receiving the specific internal connector 252 for mating and making an optical connection with the external fiber optic connector 100.

Adapter 260A and other components of an explanatory modular sub-assembly 310SA are depicted in FIGS. 13-15. FIGS. 15-17 depict various views of securing member 310M that is a portion of the modular sub-assembly 310SA.

Adapter 260A is suitable for securing an internal fiber optic connector (not visible) thereto for aligning the internal connector with the respective connection port for optical mating with the external male plug connector. One or more optical fibers may be routed from the PWDM device or RWDM device and terminated with an internal connector that may be received in the respective adapter 260A of each modular adapter sub-assemblies 310SA for optical connection at connection port. For instance, the multifiber output connection ports may use a MT-based connection port or not. Input connection ports may use single or multifiber connection ports depending on the desired optical layout.

Each of the respective internal fiber optic connectors aligns and attaches to the respective adapter 260A or other structure related to the connection port passageway in a suitable matter. Internal fiber optic connectors may comprise a suitable connector ferrule as desired and internal fiber optic connectors may take any suitable form from a simple ferrule that attaches to a standard connector type inserted into an adapter such as a LC, SC, MT or other suitable connector. By way of example, internal fiber optic connectors may comprise a resilient member for biasing the connector ferrule or not. Additionally, internal connectors may further comprise a keying feature as desired. The use of non-standard internal connectors is also possible with the concepts.

Adapters 230A may comprise a retention feature (not visible) for seating the adapters 230A to adapter body 255. Further, adapters 230A may comprise latch arms for securing respective internal connectors therein.

On the fronts side, the connection port passageways 233 may comprise a keying portion disposed forward of the securing feature 310 in connection port passageway. The keying portion may be an additive keying portion to the primitive geometric round shape of the input connection port passageway 233 such as a male key that is disposed forward of the securing feature in the port passageway. However, the concepts for the connection port(s) of terminals 200 may be modified for different connector designs. However, the additive keying portion keeps non-compliant external connectors from inadvertently damaging the connection port.

Further, the portions or components of the shell 210 may have interlocking features between the first portion 210A and the second portion 210B of the shell 210. Specifically, portions of the terminal may have a tongue and/or groove construction for alignment or sealing of the terminal.

Terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element (not visible) disposed between the first portion 210A and the second portion 210B of the shell 210. The sealing element 290 may cooperate with shell 210 geometry such as respective grooves 210G or tongues in the shell 210. Grooves or tongue may extend about the perimeter of the shell 210. By way of explanation, grooves 2 may receive one or more appropriately sized O-rings or gaskets for weatherproofing terminal 200, but an adhesive or other material may be used in the groove. By way of example, the O-rings are suitably sized for creating a seal between the portions of the shell 210. By way of example, suitable O-rings may be a compression O-ring for maintaining a weatherproof seal.

Other embodiments may use an adhesive or suitable welding of the shell for sealing the terminal 200. If welding such as ultra-sonic or induction welding of the shell is used a special sealing element 290 may be used as known in the art. If the terminal 200 is intended for indoor applications, then the weatherproofing may not be required.

To make identification of optical layout for terminals, a marking indicia may be used such as text or color-coding of the terminal, color codes on the actuator 310A, or labels, alpha-numermic codes or the like. Further, terminals may have the ports disposed in any suitable location. As shown, the connector ports of the terminal 200 may comprise a marking indicia such as a QR or bar code for detailing the optical network construction. For instance, the marking indicia may be on the securing feature 310 such as text on the actuator or the actuator(s) may be color-coded to indicate fiber count, input or output for the associated connection port or input port.

Portions of shell 210 may also provide alignment features for aligning one or more the modular adapter sub-assembly 310SA (FIG. 7) with the respective input or output connection ports of the terminal. For instance, alignment features in the shell may cooperate with the geometry of the top or bottom of adapter body 255. Portions of the shell 210 may also include a plurality of studs adjacent the respective connection port within cavity 216 for seating the hoop 255H of the adapter body 255 for assembly as well. Portion of shell 210 may include other features such as alignment or interlocking features.

FIG. 13 shows an assembled view of the modular adapter sub-assembly 310SA for connection ports depicted in FIG. 7. Modular adapter sub-assemblies 310SA enable quick and easy assembly of terminals 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

Figure 14A:
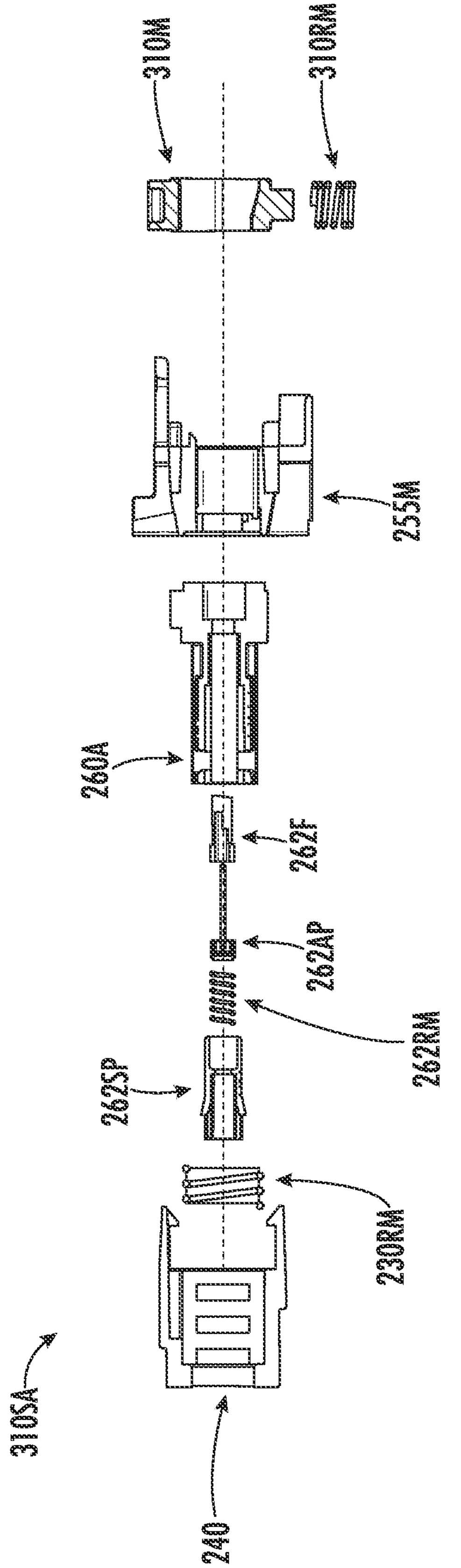

FIG. 14 depicts a sectional view of the multifiber modular adapter sub-assembly 310SA comprising a multifiber adapter body 255M suitable for mating a multifiber male plug connector at the connection port. FIG. 14a is an exploded view of the multifiber modular adapter sub-assembly 310SA. Adapter body 255M is similar to adapter body 255 so common parts such as securing member 310M and 310RM may be used in either sub-assembly 310SA. Other parts change for the footprint of multifiber connector such as for supporting the MT ferrule 262F within the multifiber connection port. For instance, FIG. 14a shows the multifiber modular adapter sub-assembly 310SA would use alignment pins 262AP, resilient member 262RM, spring push 262SP that would be specific for the multifiber connection port for termanal 200. When installed, the modular adapter sub-assemblies 310SA comprises an adapter 230A,260A aligned with the respective connection port for receiving a portion of the external male plug connector when mated. Adapters 230A,260A may be biased by a resilient member 230RM, 260RM if desired.

As discussed, modular adapter sub-assembly 310SA comprises a portion of securing feature 310 and a securing feature resilient member 310RM. Securing member 310M is inserted into a front end of an multifiber adapter body 255M along with securing feature resilient member 310RM as shown in FIGS. 13 and 14. Specifically, the rim or upper portion of securing member 310M is inserted into a hoop 255H of adapter body 255,255M and standoffs 310SO are disposed in a portion of the resilient member pocket 255SP at the bottom of the adapter body 255,255M. Securing feature resilient member 310RM is disposed in the resilient member pocket 255SP for biasing the securing member 310M to a retain position (i.e., upward) as shown in FIG. 13. This construction advantageously keeps the assembly intact using the securing feature resilient member 310RM. Standoffs 310SO of adapter body 255,255M may also act as stops to limit the translation of the securing member 310. Modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer 240 along with the adapter 230A. Adapter body 255,255M has a portion of the connection port passageway 233 disposed therein.

Resilient member 230RM is assembled so that is disposed over a barrel of adapter 230A and seated on the flange of adapter 230A, then retainer 240 can be attached to adapter body 255 using latch arms 240LA to secure the same. Ferrule sleeve retainer and ferrule sleeve are aligned for assembly into the adapter 230A for assembly as shown and seated using the ferrule sleeve retainer. Of course, other variations of the modular adapter sub-assembly 310SA are possible.

The modular adapter sub-assemblies 310SA for the connection ports may be assembled prior to placing into one or more portions of shell 200 for ease of manufacture and separate assembly work streams.

Portions 210A,210B of shell 210 may also comprises alignment features sized and shaped for cooperating with the alignment features on the top of adapter body 255 for securing the same when the terminal is assembled. The respective alignment features may only allow assembly of the modular adapter sub-assemblies 310SA into the shell 210 in one orientation for the correct orientation of the locking feature 310L with respect to the connection port 236.

Actuator 310A the button depicted in FIG. 9 may also be a different color or have a marking indicia for identifying the port type. For instance, the actuator 310A may have a first color for primary output connection ports and a second color for redundant ports. Similar color schemes may be used for multi-fiber ports, Tx/Rx ports, etc. Other marking indicia schemes may be used as desired.

When an external fiber optic connector is inserted into the respective port, locking feature of the external connectors move into and interact with the bore 310B of securing member 310M. As shown in FIGS. 15-17, locking feature 310L is configured as ramp 310RP that runs to a short flat portion, then to a ledge for creating the retention surface 310RS for engaging and retaining the external connector (or housing 20) once it is fully-inserted into the connector port passageway of the output connection port OCP. Consequently, the securing feature 310 is capable of moving to an open position (OP) when inserting a suitable external male plug connector into the connector port passageway 233 since the connector engages the ramp 310RP pushing the securing feature 310M downward during insertion. However, other locking features may be used with the concepts disclosed herein.

Securing member 310M may also comprises standoffs 310 as best shown in FIG. 17. Standoffs 310 SO cooperate with the resilient member pocket 255SP of the adapter body 255,255M for keeping the bore 310B in the proper rotational orientation within the respective to the adapter body 255, 255M. Specifically, standoffs 310 have curved shapes that only allow the securing member 310M to fully-seat into the adapter body 255,255M when oriented in the proper orientation.

As best shown in FIG. 14, adapter body 255,255M comprises an adapter body bore 255B that comprises a portion of the connection port passageway 233 when assembled. As discussed, adapter body 255,255M may also comprise alignment features on the bottom of adapter body 255,255M that cooperate with the shell 210 to align and seat the same in the shell 210. Adapter body 255,255M also comprises hoop 255H. Hoop 255H captures a portion of the securing member 310M when assembled as shown in FIG. 13, and also seats the adapter body 255,255M in the shell 210 during assembly as best shown in FIG. 7. Adapter body 255,255M also comprise resilient member pocket 255SP at the bottom of the adapter body 255 for capturing the securing feature resilient member 310RM as depicted in FIG. 13.

Adapter 230A comprises a plurality of resilient arms 230RA comprising securing features (not numbered). Adapter 230A also comprises an adapter key for orientating the adapter 230A with the adapter body 255. Securing features 230SF cooperate with protrusions on the housing of internal fiber optic connector for retaining the internal fiber optic connector to the adapter 230A. The ferrule 252F is disposed within the ferrule sleeve 230FS when assembled. Ferrule sleeves 230FS are used for precision alignment of mating ferrules between internal connectors 252 and the external connectors. Adapters 230A,260A are secured to an adapter body 255,255M using retainer 240. Adapters 230A, 260A may be biased using a resilient member 230RM, 260RM as shown. Internal fiber optic connectors of terminal may take any suitable form and be aligned for mating with the connector secured with the connection ports in any suitable manner. Devices may use alternative internal connectors if desired and can have different structures for supporting different internal connectors.

External male plug connector suitable for mating with the connection ports of terminal 200 having a locking feature integrally formed in the outer surface OS of the connector housing. Locking feature 20L cooperates with the securing member 310M and the external connector 100 in the connection port of the terminal 200. The connection port of terminal 200 may also include a keying portion for orientating the rotational position of the external male plug connector upon insertion into the respective connection port of the terminal.

The concepts disclosed allow relatively small terminals 200 having a relatively high-density of connections along with an organized arrangement for connectors 10 attached to the terminals 200. Shells have a given height H, width W and length L that define a volume for the terminal as depicted in FIG. 9. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of terminals 200 comprise a connection port insert 230 having a port width density of at least one connection port 236 per 20 millimeters of width W of the terminal 200. Other port width densities are possible such as 15 millimeters of width W of the terminal. Likewise, embodiments of terminals 200 may comprise a given density per volume of the shell 210 as desired.

One of the reasons that the size of the terminals may be reduced in size with the concepts disclosed herein is that the external connectors that cooperate with the terminals have locking features that are integrated into the housing. In other words, the locking features for holding the fiber optic connector in the respective port of the terminal are integrally formed in the housing of the connector, instead of being a distinct and separate component on the external connector that requires a larger connection port.

In other words, fiber optic connectors 100 avoid bulky structures such as a coupling nut or bayonet used with conventional hardened external connectors and multiports. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which may also aid in reducing the size of the terminals disclosed herein.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic terminal comprising ports for supporting physical path redundancy in an optical network, comprising:

a shell defining a cavity;

at least one primary wavelength division multiplexer device disposed within the cavity of the shell;

at least one redundant wavelength division multiplexer device disposed within the cavity of the shell;

at least one input connection port wherein the at least one input connection port comprises at least a first input optical fiber and a second input optical fiber with the first input optical fiber being in optical communication with the at least one PWDM device, and the second input optical fiber being in optical communication with the at least one RWDM device;

at least one multifiber primary output connection port comprising an optical connector opening and a connection port passageway formed in a portion of the shell for receiving an external male plug connector, wherein the at least one multifiber primary output connection port is in optical communication with the at least one primary wavelength division multiplexer device; and at least one multifiber redundant output connection port comprising an optical connector opening and a connection port passageway formed in a portion of the shell for receiving an external male plug connector, wherein the at least one multifiber redundant output connection port is in optical communication with the at least one redundant wavelength division multiplexer device.

2. The fiber optic terminal of claim 1, wherein the at least one input connection port comprises at least a first input optical channel comprising a first transmit channel and a first receive channel being in optical communication with the at least one PWDM device, and a second input optical channel comprising a second transmit channel and a second receive channel being in optical communication with the at least one RWDM device.

3. The fiber optic terminal of claim 1, wherein the at least one multifiber primary output connection port comprises at least one optical channel further comprising at least one receive optical pathway and at least one transmit optical pathway.

4. The fiber optic terminal of claim 1, wherein the at least one multifiber redundant output connection port comprises at least one optical channel further comprising at least one receive optical pathway and at least one transmit optical pathway.

5. A fiber optic terminal for supporting physical path redundancy in an optical network, comprising:

a shell defining a cavity;

at least one primary wavelength division multiplexer device disposed within the cavity of the shell;

at least one redundant wavelength division multiplexer device disposed within the cavity of the shell;

at least one input connection port wherein the at least one input connection port comprises two primary input optical fibers and two redundant input optical fibers with the two primary input optical fibers being in optical communication with the at least one PWDM device, and the two redundant input optical fibers being in optical communication with the at least one RWDM device;

at least one multifiber primary output connection port comprising an optical connector opening and a connection port passageway formed in a portion of the shell for receiving an external male plug connector, wherein the at least one multifiber primary output connection port is in optical communication with the at least one primary wavelength division multiplexer device; and at least one multifiber redundant output connection port comprising an optical connector opening and a connection port passageway formed in a portion of the shell for receiving an external male plug connector, wherein the at least one multifiber redundant output connection port is in optical communication with the at least one redundant wavelength division multiplexer device.

6. The fiber optic terminal of claim 5, wherein the two primary input optical fibers comprise a primary transmit fiber and a primary receive fiber being in optical communication with the at least one PWDM device, and the two redundant input optical fibers comprise a redundant transmit fiber and a redundant receive fiber being in optical communication with the at least one RWDM device.

7. The fiber optic terminal of claim 5, wherein the at least one multifiber primary output connection port comprises four optical channels with each optical channel comprising at least one receive optical pathway and at least one transmit optical pathway.

8. A fiber optic terminal for supporting physical path redundancy in an optical network, comprising:

a shell defining a cavity;

at least one primary wavelength division multiplexer device disposed within the cavity of the shell;

at least one redundant wavelength division multiplexer device disposed within the cavity of the shell;

at least one input connection port wherein the at least one input connection port comprises two primary input optical fibers and two redundant input optical fibers with the two primary input optical fibers being in optical communication with the at least one PWDM device, and the two redundant input optical fibers being in optical communication with the at least one RWDM device;

the at least one multifiber primary output connection port comprises four optical channels with each of the four optical channels comprising a receive optical pathway and a transmit optical pathway, and the at least one multifiber primary output connection port comprises an optical connector opening and a connection port passageway formed in a portion of the shell for receiving an external male plug connector, wherein the at least one multifiber primary output connection port is in optical communication with the at least one primary wavelength division multiplexer device; and at least one multifiber redundant output connection port comprises four optical channels with each of the four optical channels comprising a receive optical pathway and a transmit optical pathway, the at least one multifiber redundant output connection port comprising an optical connector opening and a connection port passageway formed in a portion of the shell for receiving an external male plug connector, wherein the at least one multifiber redundant output connection port is in optical communication with the at least one redundant wavelength division multiplexer device.

9. The fiber optic terminal of claim 8, wherein the at least one multifiber primary output connection port has a fiber layout with the respective receive optical pathways interleaved with the transmit optical pathways of the four optical channels.

10. The fiber optic terminal of claim 1, wherein the shell comprises a first portion and a second portion, wherein the at least one PWDM device and at least one RWDM device are disposed in the first portion of the shell, and wherein the input connection port, at least one multifiber primary output connection port and at least one multifiber redundant output connection port are disposed in the second portion of the shell.

11. The fiber optic terminal of claim 1, wherein the at least one multifiber primary output connection port and the at least one multifiber redundant output connection port are disposed in the same row of connection ports on the terminal.

12. The fiber optic terminal of claim 1, wherein the first output connection port further comprises a securing feature biased to a retain position by a resilient member.

13. The fiber optic terminal of claim 12, wherein the securing feature comprises a bore comprising a locking feature for attaching the first fiber optic connector.

14. The fiber optic terminal of claim 13, wherein the locking feature comprises a ramp with a ledge.

15. The fiber optic terminal of claim 13, wherein the locking feature comprises a retention surface.

16. The fiber optic terminal of claim 1, wherein the terminal is weatherproof.

17. The fiber optic terminal of claim 1, wherein the shell defines a volume of 800 cubic centimeters or less.

18. The fiber optic terminal of claim 1, wherein the fiber optic terminal has a port width density of at least one connection port per each 20 millimeters of width of terminal.

19. The fiber optic terminal of claim 1, further comprising a marking indicia for the optical layout of the terminal.

20. The fiber optic terminal of claim 1, wherein the at least one input connection port (236) comprises a keying portion for proper orientation of an external fiber optic connector into the at least one connection port (236).

21. The fiber optic terminal of claim 20, wherein the keying portion comprises a protrusion for engaging with a female key disposed on the external fiber optic connector.

* * * * *